(12) United States Patent
Cho et al.

(10) Patent No.: US 10,872,220 B2
(45) Date of Patent: Dec. 22, 2020

(54) METHOD FOR ACQUIRING BIOMETRIC INFORMATION AND ELECTRONIC DEVICE SUPPORTING THE SAME

(71) Applicant: Samsung Electronics Co., Ltd., Gyeonggi-do (KR)

(72) Inventors: Joung Min Cho, Seoul (KR); Jeong Hun Kim, Gyeonggi-do (KR); Oh Hyuck Kwon, Gyeonggi-do (KR); Tae Sung Kim, Gyeonggi-do (KR); Hyung Dal Kim, Gyeonggi-do (KR); Hyun Chang Shin, Gyeonggi-do (KR); Song Hee Jung, Gyeonggi-do (KR); Jeong Min Park, Gyeonggi-do (KR); Hyung Sup Byeon, Gyeonggi-do (KR); Heung Sik Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 15/955,929

(22) Filed: Apr. 18, 2018

(65) Prior Publication Data

US 2018/0300526 A1    Oct. 18, 2018

(30) Foreign Application Priority Data

Apr. 18, 2017  (KR) .................. 10-2017-0050039

(51) Int. Cl.
*G06K 9/00*        (2006.01)
*G06F 21/32*       (2013.01)
(Continued)

(52) U.S. Cl.
CPC .........  *G06K 9/0004* (2013.01); *G06F 1/1626* (2013.01); *G06F 1/1684* (2013.01);
(Continued)

(58) Field of Classification Search
CPC ............... G06K 9/0004; G06K 9/2027; G06K 9/00013; G06K 9/00919; G06K 9/00;
(Continued)

(56) References Cited

U.S. PATENT DOCUMENTS 6,960,788 B2    11/2005  Joo et al.
9,467,848 B1 *  10/2016  Song .................. G06F 21/32
(Continued)

FOREIGN PATENT DOCUMENTS

CN    204028936 U    12/2014
CN    105702176 A    6/2016
(Continued)

OTHER PUBLICATIONS

International Search Report dated Aug. 21, 2018.
(Continued)

*Primary Examiner* — Vinh T Lam
(74) *Attorney, Agent, or Firm* — Cha & Reiter, LLC

(57) ABSTRACT

An electronic device and method are disclosed herein. The electronic device includes a display, a biometric sensor, and at least one processor. The processor implements the method, including: when a touch input is detected to the display within the biometric sensing area, increase a brightness of a first pixel group within the biometric sensing area to a first brightness level, and execute at least one of maintaining and changing display of a second pixel group outside the biometric sensing area and, wherein the at least one of maintaining and changing display of the second pixel group includes one of: executing a black state in which display through the second pixel group is disabled, and changing a display attribute for the second pixel group such that a load on the second pixel group is reduced.

30 Claims, 17 Drawing Sheets

(51) Int. Cl.
G06F 3/041 (2006.01)
G06F 3/042 (2006.01)
G06K 9/20 (2006.01)
G09G 3/3225 (2016.01)
G06F 1/16 (2006.01)
G09G 5/36 (2006.01)
G09G 5/10 (2006.01)
G09G 5/02 (2006.01)

(52) U.S. Cl.
CPC ............ *G06F 3/042* (2013.01); *G06F 3/0412* (2013.01); *G06F 3/0416* (2013.01); *G06F 21/32* (2013.01); *G06K 9/00013* (2013.01); *G06K 9/00919* (2013.01); *G06K 9/2027* (2013.01); *G09G 3/3225* (2013.01); *G09G 5/10* (2013.01); *G09G 5/36* (2013.01); *G06F 2203/04102* (2013.01); *G09G 5/02* (2013.01); *G09G 2310/04* (2013.01); *G09G 2320/0257* (2013.01); *G09G 2320/046* (2013.01); *G09G 2320/0626* (2013.01); *G09G 2330/022* (2013.01); *G09G 2354/00* (2013.01); *G09G 2358/00* (2013.01); *G09G 2360/144* (2013.01); *G09G 2370/04* (2013.01)

(58) Field of Classification Search
CPC ........ G06K 9/20; G09G 3/3225; G06F 3/042; G06F 3/0416; G06F 3/0412; G06F 21/32; G06F 2203/04102; G06F 3/041
See application file for complete search history.

(56) References Cited

U.S. PATENT DOCUMENTS

| | | | |
|---|---|---|---|
| 9,704,013 B2 | 7/2017 | Nelson | |
| 9,805,242 B2 | 10/2017 | Cho et al. | |
| 9,858,865 B2 | 1/2018 | Gu et al. | |
| 9,910,524 B1* | 3/2018 | Wells | G06F 1/1684 |
| 9,962,128 B2* | 5/2018 | Shim | A61B 5/742 |
| 10,019,705 B2* | 7/2018 | Seol | G06Q 20/356 |
| 2004/0211960 A1 | 10/2004 | Joo et al. | |
| 2013/0259321 A1* | 10/2013 | Aoki | G06K 9/00885 382/115 |
| 2014/0056491 A1* | 2/2014 | Knight | G06K 9/2036 382/118 |
| 2015/0235098 A1* | 8/2015 | Lee | G06F 3/04883 715/709 |
| 2015/0356339 A1* | 12/2015 | Demos | G06K 9/00885 348/77 |
| 2016/0050378 A1* | 2/2016 | Wu | G06K 9/00013 348/77 |
| 2016/0171281 A1* | 6/2016 | Park | G06F 3/044 382/124 |
| 2016/0283772 A1* | 9/2016 | Nelson | G06K 9/00 |
| 2016/0291640 A1 | 10/2016 | Seo | |
| 2016/0306533 A1 | 10/2016 | Agarwal et al. | |
| 2016/0342781 A1* | 11/2016 | Jeon | G06F 1/1684 |
| 2016/0365037 A1 | 12/2016 | Gu et al. | |
| 2017/0024597 A1 | 1/2017 | Cho et al. | |
| 2017/0068447 A1* | 3/2017 | Hong | G06F 3/04883 |
| 2017/0220838 A1* | 8/2017 | He | G06F 3/0412 |
| 2017/0220842 A1* | 8/2017 | Thompson | G06F 1/1643 |
| 2017/0228579 A1* | 8/2017 | Zhu | G06K 9/0004 |
| 2017/0242852 A1* | 8/2017 | Clain | G06F 9/451 |
| 2017/0243043 A1* | 8/2017 | Andersson | G06K 9/001 |
| 2017/0289805 A1* | 10/2017 | Hong | H04W 12/08 |
| 2017/0292827 A1* | 10/2017 | Haverkamp | G01B 11/26 |
| 2017/0364763 A1 | 12/2017 | Jin et al. | |
| 2017/0372122 A1* | 12/2017 | Shim | H04W 12/0605 |
| 2017/0374036 A1* | 12/2017 | Ross | A61B 5/021 |
| 2018/0012057 A1 | 1/2018 | Cho et al. | |
| 2018/0032779 A1* | 2/2018 | Yang | G06K 9/0002 |
| 2018/0074627 A1 | 3/2018 | Kong et al. | |
| 2018/0096188 A1 | 4/2018 | Xu | |
| 2018/0114047 A1 | 4/2018 | Kim et al. | |
| 2018/0189468 A1* | 7/2018 | Shim | G06K 9/00006 |
| 2018/0204036 A1* | 7/2018 | Akhavan Fomani | G06F 3/0416 |
| 2018/0211078 A1* | 7/2018 | Lillie | G06K 9/0002 |
| 2018/0211090 A1* | 7/2018 | Yang | G06F 1/3206 |
| 2018/0260803 A1* | 9/2018 | Seol | H04M 1/7253 |
| 2018/0285997 A1* | 10/2018 | Bostick | G09B 9/00 |
| 2018/0348959 A1 | 12/2018 | Lin et al. | |
| 2019/0295456 A1* | 9/2019 | Ling | G09G 3/2003 |

FOREIGN PATENT DOCUMENTS

| | | |
|---|---|---|
| CN | 107656665 A | 2/2018 |
| CN | 107818296 A | 3/2018 |
| EP | 3 054 399 A1 | 8/2016 |
| KR | 10-2004-0092704 A | 11/2004 |
| KR | 10-2015-0131944 A | 11/2015 |
| KR | 10-2016-0029698 A | 3/2016 |
| KR | 10-2017-0141522 A | 12/2017 |
| KR | 10-2018-0037919 A | 4/2018 |
| WO | 2015/120600 A1 | 8/2015 |
| WO | 2017/052727 A1 | 3/2017 |

OTHER PUBLICATIONS

European Search Report dated Sep. 3, 2018.
Akimoto, et al.; "Clamped-inverter circuit architecture for luminescent-period-control driving of active-matrix OLED displays"; Journal of the Society for Information Display; 2005; vol. 13; No. 5; p. 429; XP055539868.
Jafarabadiashtiani; "Pixel Circuits and Driving Schemes for Active-Matrix Organic Light Emitting Diode Displays"; 2007; XP055539863.
European Search Report dated Jan. 17, 2019.

* cited by examiner

METHOD FOR ACQUIRING BIOMETRIC INFORMATION AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2017-0050039, filed on Apr. 18, 2017, in the Korean Intellectual Property Office, the disclosure of which is incorporated by reference herein its entirety.

TECHNICAL FIELD

The present disclosure relates to a biometric sensor operating technology, and more particularly, to obtaining biometric information through a display.

BACKGROUND

In recent years, as the electronic devices equipped with independent operating systems have been widely supplied, the electronic devices have provided various functions that pursue conveniences of the users. As an example, the electronic devices may support processing of various financial trades or electronic payments by constructing service infrastructures, such as mobile banking, with the financial institutes. In this case, the function operating environments of the electronic devices may involve sensitive and private information resources, such as private user information, financial processing information, or credit card information. Accordingly, the high-level security policies are utilized for the electronic devices, and recently, biometric authentication systems based on unique physical or behavior features of the users have been mounted on the electronic devices. Among the biometric authentication systems of various aspects, the fingerprint recognition technology may provide high security, stability, or use convenience so that the demands of the fingerprint recognition technology are increasing.

The above information is presented as background information only to assist with an understanding of the present disclosure. No determination has been made, and no assertion is made, as to whether any of the above might be applicable as prior art with regard to the present disclosure.

SUMMARY

The fingerprint recognition may extract feature points from an image or a video acquired by sensing a fingerprint of the user, and may authenticate the user through comparison analysis with a fingerprint template registered in advance. Then, a sensing area (or a sensor) that recognizes a fingerprint of the user may be included in a physical key or a software key disposed in a bezel of the electronic device. In this case, the sensing area may become a restriction on a large-area trend of the display, and it may not be easy for the body (e.g., a finger) of the user who grips the electronic device to easily approach the sensing area.

The present disclosure may provide a method for acquiring fingerprint information, by which a base for optimization of approach of the user or a large area of the display may be provided by realizing a fingerprint sensing area with a screen area of a display, and an electronic device supporting the same.

The present disclosure may provide a method for acquiring fingerprint information, by which high-brightness light emission for a fingerprint sensing area may be controlled by utilizing light by driving of a display as a light source utilized for recognition of a fingerprint, and an electronic device supporting the same.

In accordance with an aspect of the present disclosure, there is provided an electronic device including a display including a plurality of pixels, a biometric sensor disposed below a biometric information sensing area of the display, and at least one processor electrically connected to the display and the biometric sensor.

The processor may be configured to when an event signal related to sensing of biometric information is received, control a first pixel group corresponding to the biometric information sensing area in a high brightness mode (HBM), and maintain or convert a second pixel group corresponding to at least a partial area of a surrounding area of the first pixel group in or to a black state or a low load state while the first pixel group is controlled in the HBM.

In an aspect of the present disclosure, an electronic device is disclosed including a display including a plurality of pixels, a biometric sensor disposed below the display such that contacts within a biometric sensing area of the display are detectable by the biometric sensor through the display, at least one processor electrically connected to the display and the biometric sensor, wherein the processor is configured to: when a touch input is detected to the display within the biometric sensing area, increase a brightness of a first pixel group within the biometric sensing area to a first brightness level, and execute at least one of maintaining and changing display of a second pixel group outside the biometric sensing area, wherein the at least one of maintaining and changing display of the second pixel group includes one of executing a black state in which display through the second pixel group is disabled, and changing a display attribute for the second pixel group such that a load on the second pixel group is reduced.

In an aspect of the present disclosure, an electronic device is disclosed including a display, a biometric sensor disposed below the display such that contacts within a biometric sensing area of the display are detectable by the biometric sensor through the display, and a processor electrically connected to the display and the biometric sensor, the processor configured to; alter display within the biometric sensing area to use a first display attribute, responsive to detecting an approach of an object to the biometric sensing area while the first display attribute is used, altering at least a partial display area external to the biometric sensing area to use a second display attribute, detect a signal corresponding to the object using the biometric sensor while the second display attribute is applied to the at least the partial area, and authenticate the object based at least on the detected signal.

In an aspect of the present disclosure, an electronic device is disclosed, including a display, a sensor, a biometric sensor disposed below the display such that contacts within a biometric sensing area of the display are detectable by the biometric sensor through the display, a display driver integrated circuit (IC) configured to control the display, a processor electrically connected to the display, the biometric sensor, and the display driver IC, wherein the processor is configured to: detect a user input through the biometric sensing area, identify situation information using the sensor, when the situation information satisfies a first condition, set at least a portion of the display to use a first display attribute by the display driver IC, and acquire a fingerprint from the detected the user input using the biometric sensor based on the first display attribute, and when the situation information satisfies a second condition, set the at least the portion of the display to use a second display attribute by the display driver IC, and acquire the fingerprint from the detected user input using the biometric sensor based on the second display attribute.

According to various embodiments, convenience for approach of the user for authentication of a fingerprint may be provided by realizing a fingerprint sensing area in a screen area of a display.

According to various embodiments, a sensing efficiency for inputs of various aspects, which are applied to the sensing area, may be improved by controlling high-bright light emission of the sensing area.

According to various embodiments, generation of after-images according to deviation between mutual areas may be restrained by controlling the sensing area or the non-sensing area by using an attribute of the display.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
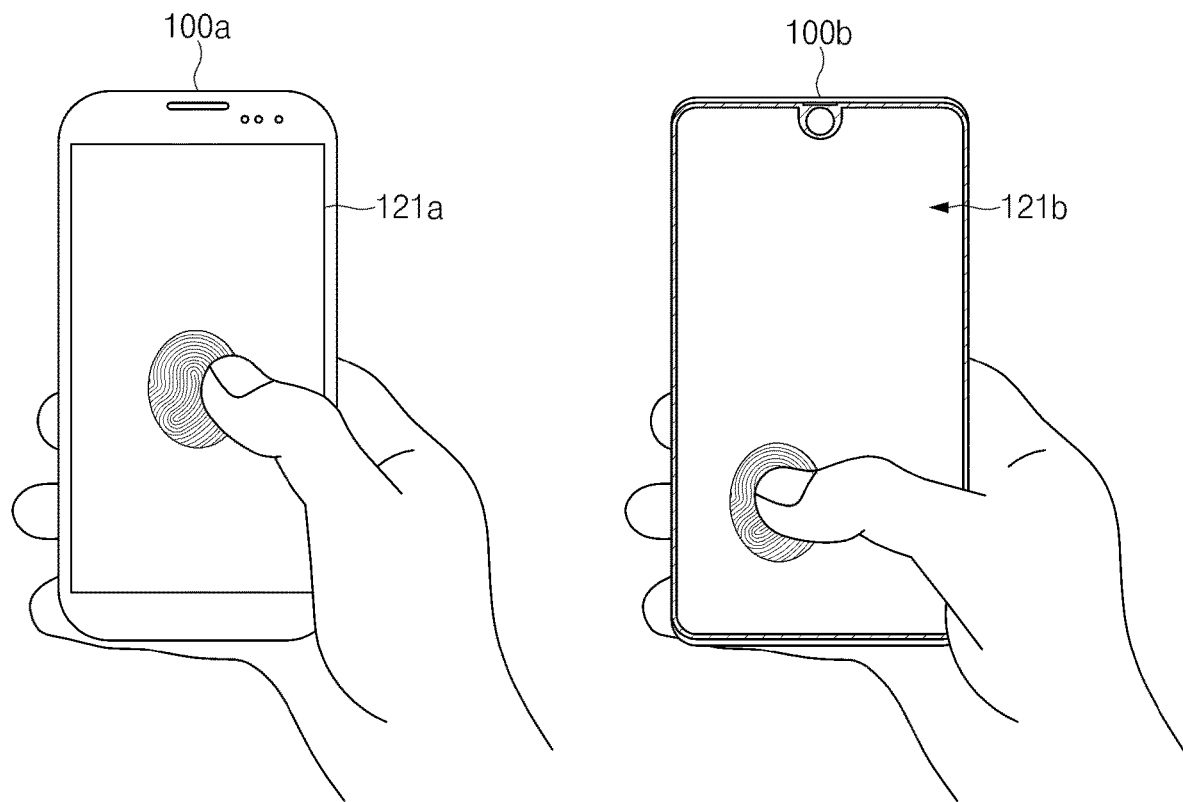
FIG. 1 illustrates an example of an operation of an electronic device according to an embodiment.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different user devices regardless of order or importance. For example, a first component may be referred to as a second component and vice versa without departing from the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device "HMD"), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates an example of an operation of an electronic device according to an embodiment.

In an embodiment, an electronic device 100a or 100b may perform authentication of a fingerprint of the user according to an operation environment. For example, if an event, such as release of a locked screen, electronic payment based price payment, or financial trading through mobile banking, occurs in the electronic device 100a or 100b, the electronic device 100a or 100b may authenticate a fingerprint of the user based on driving of a scheduled biometric authentication system or execution of a specific application.

In this regard, referring to FIG. 1, a biometric sensor that supports the authentication of the fingerprint of the user may be disposed below a screen area 121a or 121b (or a view area) of a display on the electronic device 100a or 100b. The screen area 121a of the display according to an embodiment may occupy a portion of a front area of the electronic device 100a. Further, the screen area 121b of the display according to another embodiment may occupy an extent corresponding to the front area in relation to realization of a full front display of the electronic device 100b.

In an embodiment, the biometric sensor may have an extent that is the same as or similar to the screen area 121a or 121b of the display to sense an entire area of the screen area 121a or 121b of the display. Further, the biometric sensor may have an extent corresponding to the first area to sense a specific first area (or a specific coordinate range) of the screen area 121a or 121b of the display. The first area, for example, may be included in a motion range of a finger of the user who grips the electronic device 100a or 100b, or may be realized in an area which the finger of the user may easily approach.

According to the above description, a biometric information sensing area (e.g., an area to which fingerprint information of the user is input) related to performance of a function of the biometric sensor may be included in at least one of the screen areas 121a and 121b of the display. Accordingly, the screen area of the display may be expanded by excluding at least a portion of an area (e.g., a bezel area) allocated to the biometric information sensing area from the front surface of the electronic device 100a or 100b. Further, as the biometric information sensing area is included in one of the screen areas 121a and 121b of the display, light according to driving of the display may be utilized as a light source involved in the performance of the function of the biometric sensor.

Hereinafter, various embodiments of biometric sensor mounting structures and biometric information (e.g., fingerprint information) acquisition forms of the electronic device 100a or 100b will be described.

Figure 2:
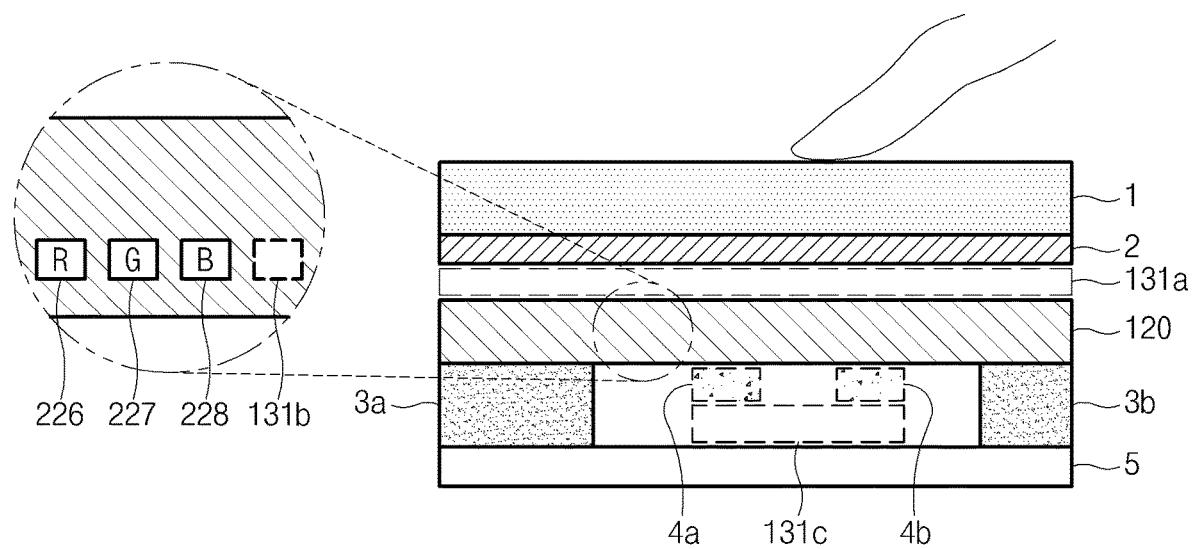
FIG. 2 is a view illustrating a stack structure of some elements of an electronic device according to an embodiment.

FIG. 2 is a view illustrating a stack structure of some elements of an electronic device according to an embodiment.

Referring to FIG. 2, an electronic device (100a or 100b of FIG. 1, hereinafter, generally denoted by 100) may include a cover glass 1, a display 120, a biometric sensor (at least one of 133a to 131c), and a printed circuit board 5, which are staked or disposed in a specific sequence. In an embodiment, the electronic device 100 may further include a housing, of which at least an area is opened, and the above-mentioned elements of the electronic device 100 may be accommodated in an interior space of the housing.

The cover glass 1 may be disposed on the display 120 to transmit light generated by the display 120. A user input (e.g., a touch, a gesture, a proximity or hovering) related to an operation or control of the electronic device 100 may be applied onto the cover glass 1. For example, an input (e.g., an input by a touch of a finger) for the acquisition of the fingerprint information of the user may be applied for a specific time period. In this regard, the cover glass 1 is inserted into the interior space of the housing, and at least a portion of the cover glass 1 may be exposed to an opened area of the housing. At least an area of the cover glass 1 inserted into the interior space of the housing may be coupled or bonded to the housing to finish the opened housing. According to various embodiments, the cover glass 1 is a simple name for an element, and the material of the cover glass 1 is not limited to glass. For example, the cover glass 1 may include a flexible film material in part in relation to realization of the flexible characteristics of the electronic device 100.

The display 120 (or a display panel) may display various contents (e.g., a text, an image, a video, an icon, or a symbol) in response to a user control or specific scheduling information. For example, when an event related to biometric authentication of the user (or acquisition of biometric information), an interface functioning as a guide for an input area of the body (e.g., a finger) of the user may be output. In an embodiment, the display 120 may include a polarizer (not illustrated). The polarizer may selectively transmit light that, among incident light, vibrates in a specific phase axis. Further, the polarizer may delay the phase of the light input to the cover glass 1.

At least one electronic component or electronic (e.g., a processor, a memory, a communication module, a speaker module, a camera module, or a circuit line) related to an operation of a function of the electronic device 100 may be mounted on the printed circuit board (or an insulation board). In an embodiment, a plurality of printed circuit boards 5 may be provided, and at least some of the printed circuit boards are electrically connected to each other.

The biometric sensor (at least one of 131a to 131c) (or an image sensor) irradiates the light by the driving of the display 120 to a body (e.g., a finger) of the user that contacts the biometric information sensing area (or an interface area which the display 120 outputs), and may acquire biometric information (e.g., a fingerprint image or a video) of the user by detecting light reflected from the body. In this regard, the biometric sensor (at least one of 131a to 131c) may be disposed in various areas on the above-mentioned stack structure of the cover glass 1, the display 120, and the printed circuit board 5. For example, the first biometric sensor 131a according to an embodiment may be bonded to a lower side of the cover glass 1 based on a bonding member 2, and may be disposed between the cover glass 1 and the display 120. In this case, the first biometric sensor 131a may be disposed, for example, in an area that is the same as or similar to that of the cover glass 1 to sense an entire area of the cover glass 1 (or the screen area of the display 120). Further, the first biometric sensor 131a may be realized by a transparent material in relation to the permittivity of the display 120.

The second biometric sensor 131b according to another embodiment may be included in at least one pixel of the display 120. For example, the second biometric sensor 131b may be disposed on the pixel while forming a specific interval from at least one RGB element 226, 227, and/or 228. The third biometric sensor 131c according to another embodiment may be disposed in an area between the display 120 and the printed circuit board 5. In this regard, at least one support member (e.g., a bracket 3a and/or 3b) for securing a mounting space of the third biometric sensor 131c, for example, may be disposed at a periphery of an area between the display 120 and the printed circuit board 5. In relation to prevention of introduction of foreign substances into the third biometric sensor 131c, the support member 3a and/or 3b may tightly finish (or seal) the area between the display 120 and the printed circuit board 5. In various embodiments, at least one elastic member (e.g., sponge or rubber) 4a and/or 4b may be disposed in an adjacent area (e.g., an upper area) of the third biometric sensor 131c to prevent an impact due to a physical contact between the third biometric sensor 131c and the display 120. According to the above description, an area in which at least one of the first to third biometric sensors 131a, 131b, and 131c may at least partially overlap a lower area of the biometric information sensing area.

Figure 3A:
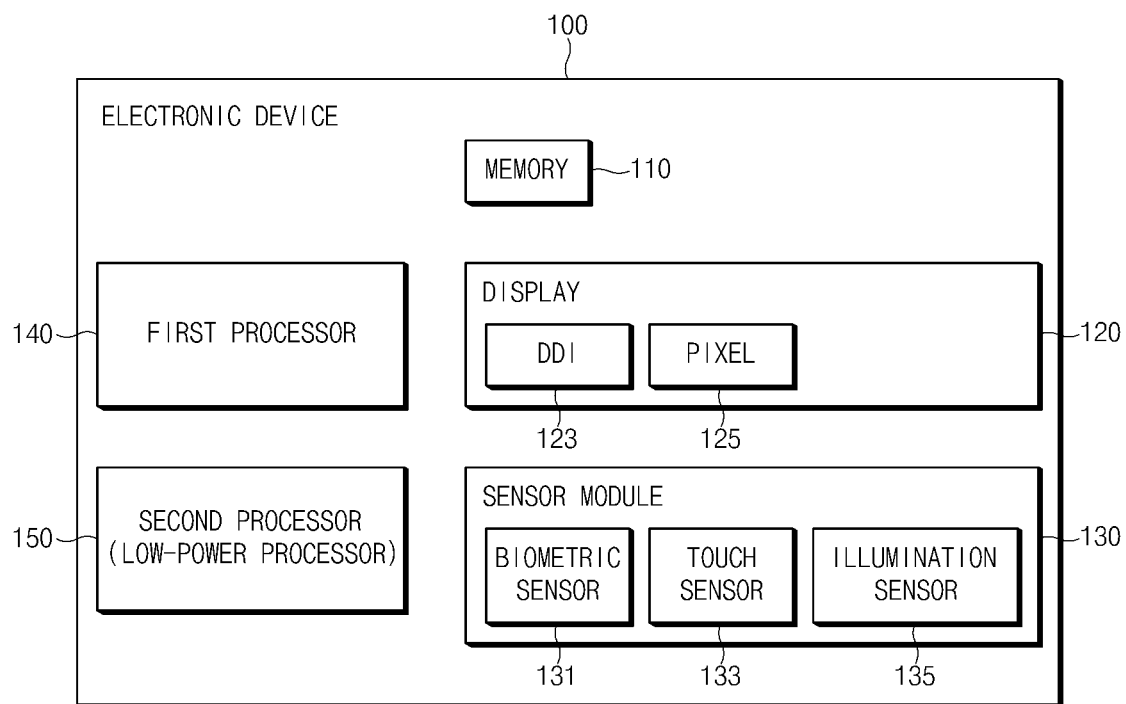
FIG. 3A is a view illustrating a configuration of an electronic device according to an embodiment.
Figure 3B:
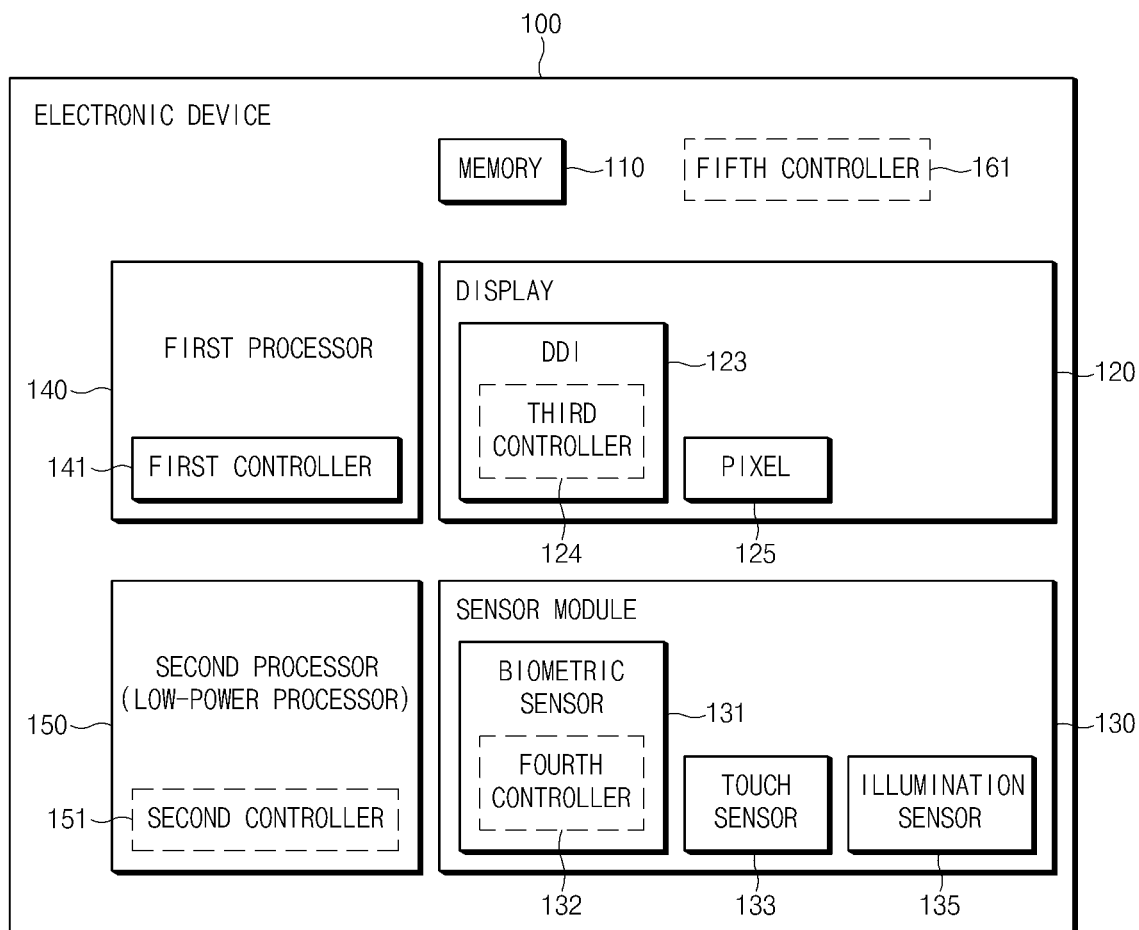
FIG. 3B is a view illustrating a configuration of an electronic device according to another embodiment.

FIG. 3A is a view illustrating a configuration of an electronic device according to an embodiment. FIG. 3B is a view illustrating a configuration of an electronic device according to another embodiment. In FIG. 3B, the elements corresponding to the elements described with reference to FIG. 3A may be provided with the same reference numerals, and a repeated description thereof may be omitted.

Referring to FIG. 3A, the electronic device 100 according to an embodiment may further include elements other than the elements described with reference to FIG. 2. For example, the electronic device 100 may include a memory 110, a display 120, a sensor module 130, or at least one processor 140 and/or 150.

The memory 110 may store a command, information, or data related to performance of functions of the elements. For example, in relation to acquisition of biometric information (e.g., fingerprint information) of the user, the memory 110 may store information (e.g., coordinate information) of an interface (e.g., an interface functioning as a guide for an input area of the body of the user) output by the display 120. In an embodiment, the memory 110 may include a security area that may be accessed based in a specific signal or route, and the biometric information of the user input to the interface may be stored at least a portion of the security area.

The memory 110 may store at least one program related to an operation of a function of the electronic device 100. For example, the memory 110 may include at least one of a financial application program (e.g., a mobile banking application or an electronic payment application) involving a user authentication, an authentication application program that supports acquisition of biometric information of the user, or a security application program (e.g., Knox) functioning as a security platform for the biometric information of the user.

The display 120 may include a display driver IC (i.e., "integrated circuit" or digital display interface "DDI") 123 or at least one pixel such as the first pixel 125. The display driver IC 123 may perform signal processing in relation to driving of the display 120 (or a display panel). For example, the display driver IC 123 may deliver a signal corresponding to image or video information delivered from the processor 140 and/or 150 to the display 120 at a specific frame rate. The display 120 may output contents by controlling emission of light of an RGB element included in the at least one pixel such as the first pixel 125 in response to the signal delivered to the display driver IC 123. In this regard, the display driver IC 123 may be electrically connected to a circuit line or a switching element included in the display 120.

The sensor module 130 may include at least one biometric sensor 131, a touch sensor 133, or an illumination sensor 135. The at least one biometric sensor 131 may recognize body characteristics or behavior characteristics of the user. In an embodiment, the biometric sensor 131 may further include at least one of an iris recognition sensor, a face recognition sensor, a voice recognition sensor, or a heart rate measuring sensor, including the fingerprint sensor or the image sensor (at least one of 131a to 131c of FIG. 2) described above.

The iris recognition sensor, for example, may recognize an iris of the user by irradiating light of a specific wavelength band to an eyeball of the user based on a camera module and analyzing reflected light. As an example, the iris recognition sensor may identify an iris area by detecting a structural border based on a color or a brightness that changes according to the light irradiated onto the eyeball. The face recognition sensor may acquire face information by analyzing a video or an image of the user captured through a camera module. For example, the face recognition sensor may recognize the face of the user by extracting a facial area of the user, for example, extraction of a difference of brightness or color or a feature point from the video or image and comparing data (e.g., a pixel value of the image) of the facial area with specific face data. The voice recognition sensor may extract a unique feature, such as a pronunciation or an accent, from a voice acquired through a microphone module of the electronic device 100, and may identify voice information of the user through mapping with the voice of the user stored in advance. The heart rate measuring sensor, for example, may irradiate light to an area of the body of the user, and may measure an amount of light reflected according to a blood flow rate of a blood vessel. The heart rate measuring sensor may identify the heart rate of the user by converting a change of the amount of the reflected light to an electrical signal and analyzing a change pattern of the electrical signal.

The touch sensor 133 may detect a signal for a user input applied onto the cover glass 1 (see FIG. 2) and may output an electrical signal. In this regard, the touch sensor 133 may include at least one electrode layer and a control circuit. The control circuit may calculate a location, an occurrence time, or a duration of a user input by detecting a change (e.g., a change of voltage) of a physical quantity by a physical contact or a change (e.g., a change of capacitance) of a physical quantity by induction of charges generated on the electrode layer. In various embodiments, the touch sensor 133 may be included as an element of the display 120, and a function of the control circuit may be performed by another element (e.g., the processor 140 and/or 150) of the electronic device 100.

The illumination sensor 135 may detect a brightness of a surrounding area of the electronic device 100. In an embodiment, the illumination sensor 135 may detect brightness in real time or at a specific cycle, and may deliver the information (e.g., an intensity of illumination) to the processor 140 and/or 150.

According to an embodiment, the electronic device 100 may include at least one of a first processor 140 or a second processor 150. The first processor 140 may perform overall control, communication calculation, or data processing of other elements of the electronic device 100. The second processor 150 (e.g., a low-power processor or a hub device for the sensor module 130) may perform an independent control from the first processor 140 for other elements of the electronic device 100. For example, when the electronic device 100 is in a sleep state, the second processor 150 may process sensing information (e.g., biometric information, touch input information, or illumination information) acquired by the sensor module 130 regardless of driving (e.g., wakeup) of the first processor 140. Further, the second processor 150 may control emission of light of at least some pixels of the display 120 to support light involved in performance of a function of the biometric sensor 131 (e.g., at least one of 131a to 131c of FIG. 2) when an event related to acquisition of biometric information of the user occurs in a sleep state or a low-power operation state of the electronic device 100.

Referring to FIG. 3B, each of the elements of the electronic device 100 may include a controller (e.g., a first controller 141, a second controller 151, a third controller 124, or a fourth controller 132). In this regard, each of the elements of the electronic device 100 may be independently driven according to an operation of the controller included in the corresponding element to perform a specific function.

In an embodiment, the electronic device 100 may further include a fifth controller 161 as a separate element. The fifth controller 161 may be a main controller that may control at least one of the first to fourth controllers 141, 151, 124, and 132. Further, the electronic device 100, for example, may set or change any one of the first to fifth controllers 141, 151, 124, 132, and 161 as or to the main controller in response to control of setting of the system of the user. In this case, the controller set as or changed to the main controller may interact with at least one of the remaining controllers to control an operation of the function of the corresponding controller.

FIG. 4A to 4E are views illustrating various biometric information acquisition forms of an electronic device according to an embodiment;

As described above, the biometric sensor (e.g., at least one of 131a to 131c of FIG. 2) may acquire biometric information (e.g., a fingerprint image or a video) of the user based on light according to operation of the display 120 (see FIG. 3A or 3B). In this way, with respect to securing of a reliability of the biometric information or improvement of a sensing efficiency of the biometric sensor (at least one of 131a to 131c), a brightness (e.g., about 600 nit) that is higher than a brightness (e.g., about 200 nit) in a general operation environment may be utilized for the light by the display 120. However, when a specific pixel of the display 120 corresponding to the biometric information sensing area of the biometric sensor (at least one of 131a to 131c) emits light at a high brightness, the specific pixel may deteriorate rapidly. Further, when the specific pixel locally emits light at a high brightness, burn-in damage (i.e., an afterimage) due to a deviation (e.g., of the increased brightness) of an attribute of the display from the surrounding pixels may be generated.

In relation to the above description, in an embodiment, the processor (140 and/or 150 of FIG. 3A or 3B) of the electronic device 100 (see FIG. 3A or 3B) may realize emission of light of high brightness, restraint of generation of an afterimage, or prevention of deterioration of the biometric information sensing area based on a control of an attribute (e.g., a brightness, a gradation, a supply power, a color, a light emission duration or a light emission initiation timing) for the display 120. Additionally or alternatively, the processor 140 and/or 150 may control high-brightness light emission of the biometric information sensing area by controlling a specific light emission function (e.g., a high brightness mode (HBM) that operates in a high-brightness environment in relation to improvement of visibility, hereinafter referred to as an HBM function) for the display 120. The HBM function of the display 120 may be triggered, for example, when an intensity of illumination of a surrounding area of the electronic device 100 exceeds a specific value. Hereinafter, various embodiments related to high-brightness light emission, avoiding screen burn-in, or prevention of deterioration of the biometric information sensing area will be discussed with reference to FIGS. 4A to 4E.

Figure 4A:
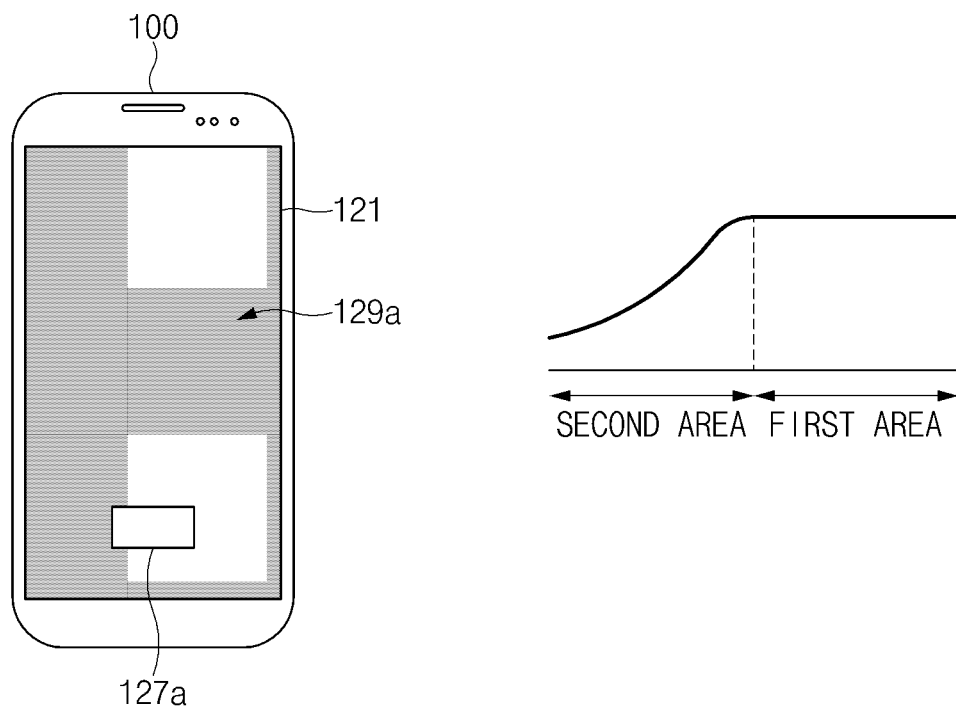
FIG. 4A is a view illustrating a first biometric information acquisition form of an electronic device according to an embodiment.

Referring to FIG. 4A, when an event related to acquisition of biometric information (e.g., fingerprint information) is detected, the processor 140 and/or 150 may output an interface 127a (e.g., a graphical user interface) that provides visual guidance for an input area for receiving biometric information in at least an area of the screen area 121 of the display 120. In this operation, the processor 140 and/or 150 may control at least one pixel corresponding to the screen area 121 of the display 120 using a first display attribute (e.g., changing a brightness). For example, the processor 140 and/or 150 may control emission of light at a specific brightness for the at least one pixel. In various embodiments, the interface 127a is not limited to the shape (e.g., a rectangular shape) illustrated in FIG. 4A, and may be realized in various shapes, such as an ellipse or a fingerprint pattern. Further, the interface 127a may have an extent or a size of a specific ratio with respect to the screen area 121 of the display 120.

In an embodiment, when receiving a specific event signal, the processor 140 and/or 150 may control a second area 129a of the screen area 121 of the display 120, different than the first area (hereinafter, the first area is denoted by reference numeral 127a) corresponding to the interface 127a, by using a second display attribute (e.g., a gradation). For example, when detecting an approach of an object (e.g., the body of the user) for the first area 127a, the processor 140 and/or 150 may control at least one pixel corresponding at least a portion of the second area 129a to a specific gradation value (e.g., 0). Based on this, the processor 140 and/or 150 may realize at least a portion of the second area 129a in a reduced brightness state or even a 'black' state of no or nearly no light emission.

In an embodiment, the black state of the second area 129a may be caused by high-brightness light emission of the first area 127a. In this regard, the above-mentioned display driver IC (DDI) 123 (see FIG. 3A or 3B) may be disposed adjacent to the first area 127a, and accordingly, a load effect may be generated between the first area 127a and 129a. The 'load effect' is a phenomenon in which a power voltage (e.g., ELVDD) drops (e.g., IR drops) the farther a particular area of the display is disposed from the display driver IC 123. As the display driver IC 123 is adjacent to the first area 127a and at least a portion of the second area 129a falls into the black state, the first area 127a may be less influenced by the power voltage drop phenomenon and a brightness of the first area 127 may resultantly be improved. For example, a higher brightness (e.g., about 612 nits) may be realized as compared with the brightness (or the specific brightness) (e.g., about 406.2 nits) of the case in which the screen area 121 emits light in a specific color throughout the entire area of the screen area 121. In this operation, the processor 140 and/or 150 may further perform control of an HBM function for at least a portion of the second area 127a with reference to an intensity of illumination of a surrounding area of the electronic device 100. For example, when the intensity of illumination exceeds a specific value, the processor 140 and/or 150 may control the HBM function by supplying high power to at least a portion of the first area 127a by using a third display attribute (e.g., supply power). In an embodiment, the load effect according to the disposition structure of the display driver IC 123 and realization of a black state of the second area 129a may be realized even in the HBM function of the first area 127a. For example, when the load effect is generated in the HBM function of the first area 127a, the brightness of the first area 127a may be improved to a brightness (e.g., about 1014.2 nits) that is higher than the brightness (e.g., about 548.2 nits) when the black state of the second area 129a is excluded.

In this way, in an operation of emitting light at a high brightness by the first area 127a, the biometric sensor (at least one of 131a to 131c) may acquire a signal corresponding to the body of the user, which contacts the first area 127a (or the biometric information sensing area). The biometric sensor (at least one of 131a to 131c) may generate biometric information (e.g., a fingerprint image or a video) based on at least a part of the acquired signal, and may perform user authentication based on the biometric information.

In various embodiments, as a part of another control using an attribute (e.g., a gradation) of the second display, the processor 140 and/or 150 may implement the brightness differential without executing a black state for the second area 129a and may control at least a partial area to a low gradation state (e.g., a gray level) through graphical filtering. In this case, contents (e.g., an image or a text) may be displayed in the second area 129a of the low gradation state. In an embodiment, the gradation value caused by the realization of the low gradation state of the second area 129a may be variably controlled according to an intensity of illumination of a surrounding area of the electronic device 100 detected by the illumination sensor 135 (see FIG. 3A or 3B). In this regard, the electronic device 100 may be equipped with a function of automatically adjusting the brightness of the screen of the display 120 according to the intensity of illumination of the surrounding area. For example, the electronic device 100 may be equipped with a brightness adjusting function of adjusting the screen of the display 120 to be brighter when detecting a high intensity of illumination in the surrounding area and adjusting the screen of the display 120 to be darker when detecting a low intensity of illumination in the surrounding area. When the intensity of illumination of the surrounding area of the electronic device 100 exceeds a specific thread range, the processor 140 and/or 150 may increase or decrease the gradation value for at least a partial area of the second area 129a to a specific value such that the gradation value corresponds to the bright adjusting function.

In an embodiment, in order to prevent a border area or a border line of the first area 127a and the second area 129a from being viewed as an afterimage according to the deviation of the display attribute between the areas, the processor 140 and/or 150 may provide a specific display effect (e.g., gradation) to an adjacent area (or a surrounding area) of the first area 127a (or the interface). For example, the processor 140 and/or 150 may provide an area included in a specific distance or a coordinate range from a periphery of the first area 127a with the display effect. The processor 140 and/or 150 may divide an area included in the specific distance or coordinate range into a plurality of areas, and may perform a control such that the gradation (or color concentration) between the first area 127a and the second area 129a becomes more similar as an area of the plurality of areas is closer to a periphery of the first area 127a by using the second display attribute (e.g., a gradation).

In various embodiments, the high-brightness light emission control of the biometric information sensing area (or the first area 127a) using the above-mentioned display attribute may be performed based on situation information related to an operation environment of the electronic device 100. For example, the processor 140 and/or 150 may control high-bright light emission of the biometric information sensing area in a first situation in which a specific application program (e.g., a mobile banking application or an electronic payment application accompanied by a user biometric authentication) is executed. Further, in a second situation in which the intensity of illumination of a surrounding area of the electronic device 100 exceeds a specific threshold value or a third situation in which a locked screen releasing event of the electronic device 100 occurs, the processor 140 and/or 150 may control high-brightness light emission of the biometric information sensing area. In various embodiments, the processor 140 and/or 150 may control high-brightness light emission for the biometric information sensing area based on a temperature of the electronic device 10 itself or a surrounding area of the electronic device 100.

Hereinafter, in FIGS. 4B to 4D, the screen area 121 of the display 120 may operate in a state in which the screen area 121 of the display 120 is controlled similarly to the above description with reference to FIG. 4A. For example, in FIGS. 4B to 4D, the first areas 127b, 127c, and 127d corresponding to the biometric information sensing area may be in a state in which light is emitted at a specific brightness according to the control using the first display attribute (e.g., a brightness). Further, the second areas 129b, 129c, and 129d may emit light at a specific gradation value according to a control using the second display attribute (e.g., a gradation) to be in a black state or a low gradation state.

Figure 4B:
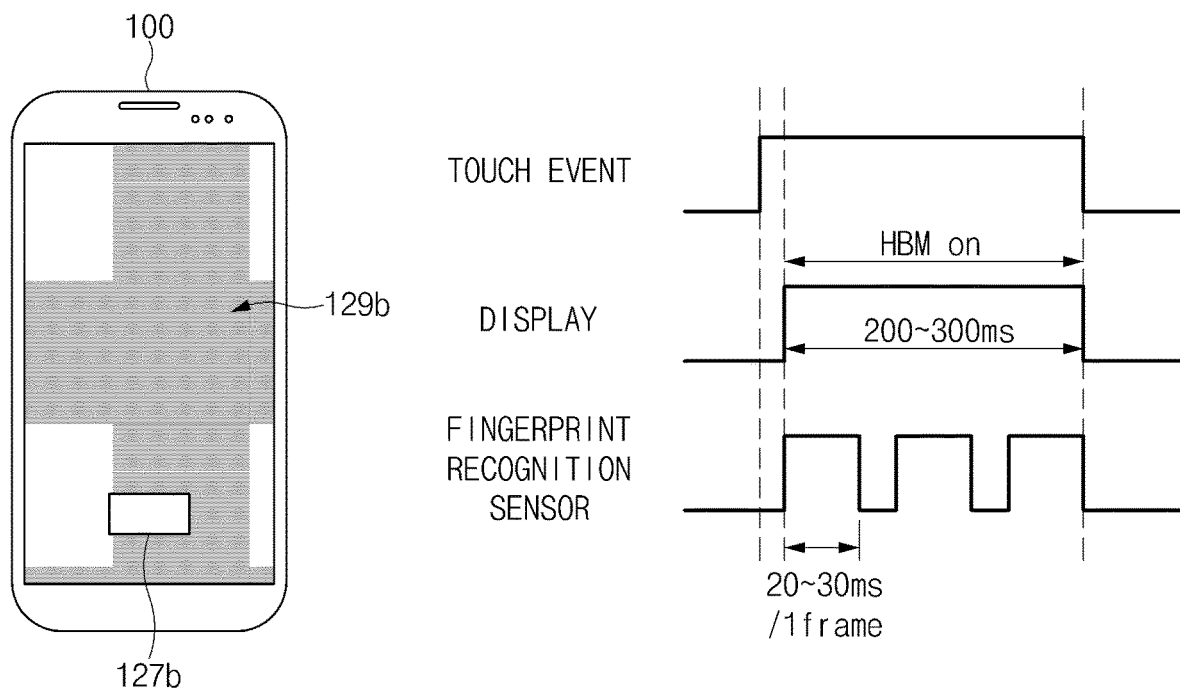
FIG. 4B is a view illustrating a second biometric information acquisition form of an electronic device according to an embodiment.

Referring to FIG. 4B, the processor 140 and/or 150 may realize high-bright light emission and/or prevention of deterioration of the first area 127b by controlling at least one pixel (hereinafter, referred to as a first pixel) corresponding to the first area 127b by using another display attribute (e.g., a light emission time). For example, the processor 140 and/or 150 may control a light emission initiation time of the first pixel. A time period for which the light emission operation of the first pixel and deterioration of the first pixel may be in a proportional relationship. Based on this, the processor 140 and/or 150 may restrain deterioration of the first pixel 125 due to minimization of the light emission time by synchronizing a sensing initiation timing of the biometric sensor (at least one of 131a to 131c) and a light emission initiation timing of the first pixel 125. In this regard, the biometric sensor (at least one of 131a to 131c) may consume a first time period (e.g., 20 to 30 ms) in acquisition of first biometric information (e.g., a fingerprint image of a first frame). Further, the biometric sensor (at least one of 131a to 131c), for example, may acquire first to third biometric information (e.g., fingerprint images of first to third frames) in relation to a user authentication (or acquisition of biometric information) of one time. The processor 140 and/or 150 may calculate a light emission duration (e.g., 200 to 300 ms) of the first pixel 125 in complex consideration of the number of acquisitions of biometric information, consumption times for the acquisitions of the biometric information, and interval times between acquisitions of the biometric information of the biometric sensor (at least one of 131a to 131c). When a user touch event related to biometric authentication occurs on the first area 127b, the processor 140 and/or 150 may control light emission of the display 120 according to initiation of sensing of the biometric sensor (at least one of 131a to 131c) and the calculated light emission duration after lapse of a specific time from the occurrence time of the event. In various embodiments, the synchronization of a sensing initiation timing of the biometric sensor (at least one of 131a to 131c) and a light emission initiation timing of the first pixel 125 may be also applied to the operation of the HBM function of the display 120 in the same way or similarly.

Figure 4C:
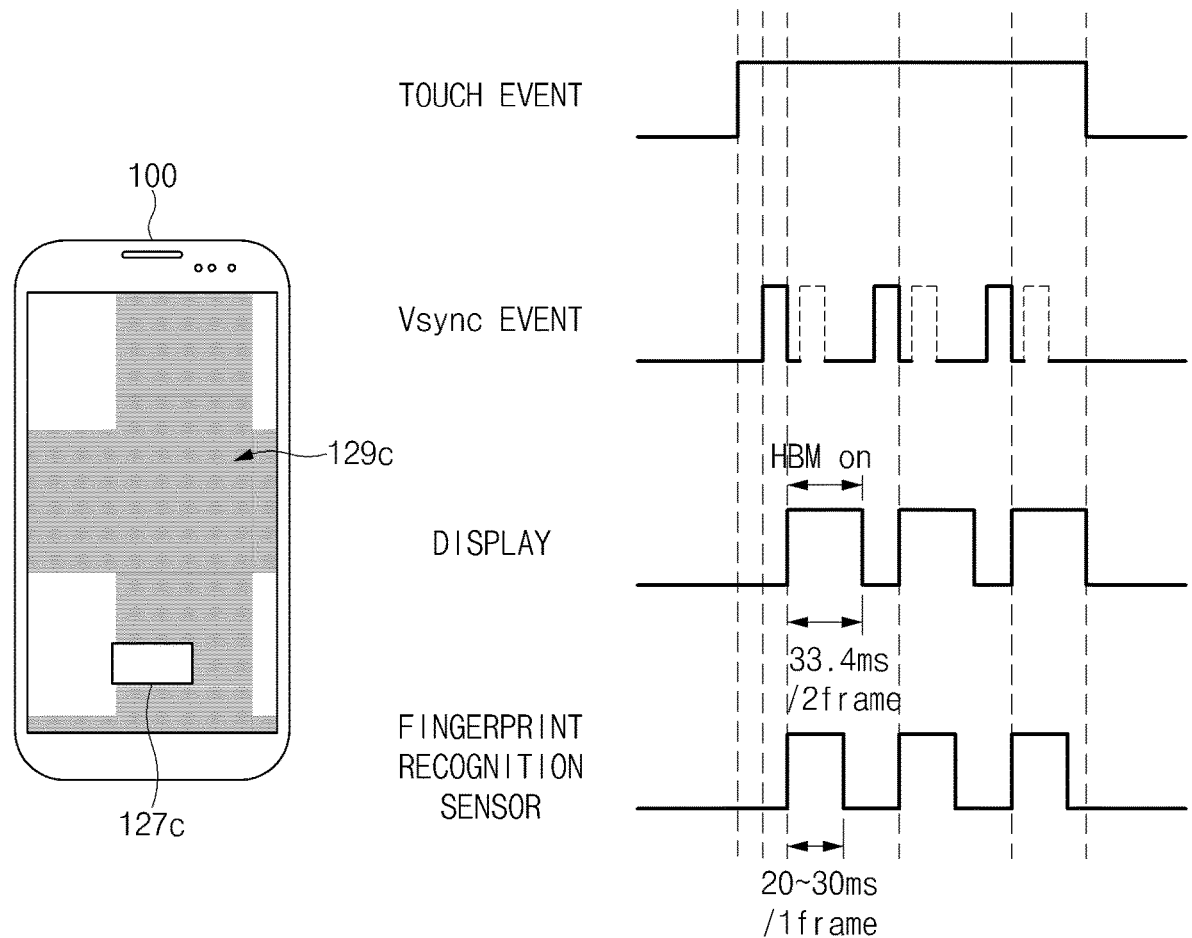
FIG. 4C is a view illustrating a third biometric information acquisition form of an electronic device according to an embodiment.

Referring to FIG. 4C, further to the embodiment using the display attribute (e.g., a light emission time) described with reference to FIG. 4B, implementation may leverage a sensing timing of the biometric sensor (at least one of 131a to 131c), and a light emission initiation timing and a light emission duration of the first pixel may be synchronized based on generation of a signal for a specific event. In an embodiment, the signal for the specific event may be a signal (e.g., a Vsync signal) that is delivered from the display 120 to the processor 140 and/or 150 to receive image information from the processor 140 and/or 150. If receiving a first signal from the display 120, the processor 140 and/or 150 may control initiation of sensing for acquiring first biometric information (e.g., a fingerprint image of the first frame) of the biometric sensor (at least one of 131a to 131c) and may control emission of light of the display 120 for a specific period of time. Then, the specific time period for the emission of light of the display 120 may be set based on a period of time (e.g., a first period of time (20 to 30 ms)) consumed for acquiring the first biometric information of the biometric sensor (at least one of 131a to 131c). In this regard, a second period of time (e.g., 16.7 ms) may be consumed in outputting an image of the first frame for the display 120. Accordingly, the light emission duration of the display 120 may be set to a period of time (e.g., 33.4 ms) consumed for outputting images of the first and second frames for the display 120 to supplement a period of time (e.g., the first period of time (20 to 30 ms)) consumed for acquiring the first biometric information of the biometric sensor (at least one of 131a to 131c). In an embodiment, the processor 140 and/or 150 may not reference a signal (e.g., a signal generated after output of the image of the first frame for the display 120 before the output of the image of the second frame) generated (or delivered) for the light emission duration of the display 120 in control of initiation of sensing of the biometric sensor (at least one of 131*a* to 131*c*) and control of the emission of light of the display 120. In various embodiments, a period of time consumed for acquiring the first biometric information of the biometric sensor (at least one of 131*a* to 131*c*) may be changed according to the type of the provided sensor, and correspondingly, also may change the light emission duration of the display 120.

Based on the above description, if a second signal is received from the display 120, the processor 140 and/or 150 may control initiation of biometric detection for acquiring second biometric information of the biometric sensor (at least one of 131*a* to 131*c*) and may control emission of light of the display 120 for a specific period of time (e.g., 33.4 ms). In various embodiments, the synchronization of a sensing initiation timing of the biometric sensor (at least one of 131*a* to 131*c*) and a light emission initiation timing or a light emission duration of the first pixel 125 (e.g., the pixel corresponding to the biometric information sensing area) may be also applied to the operation of the HBM function of the display 120 in the same way or similarly.

Figure 4D:
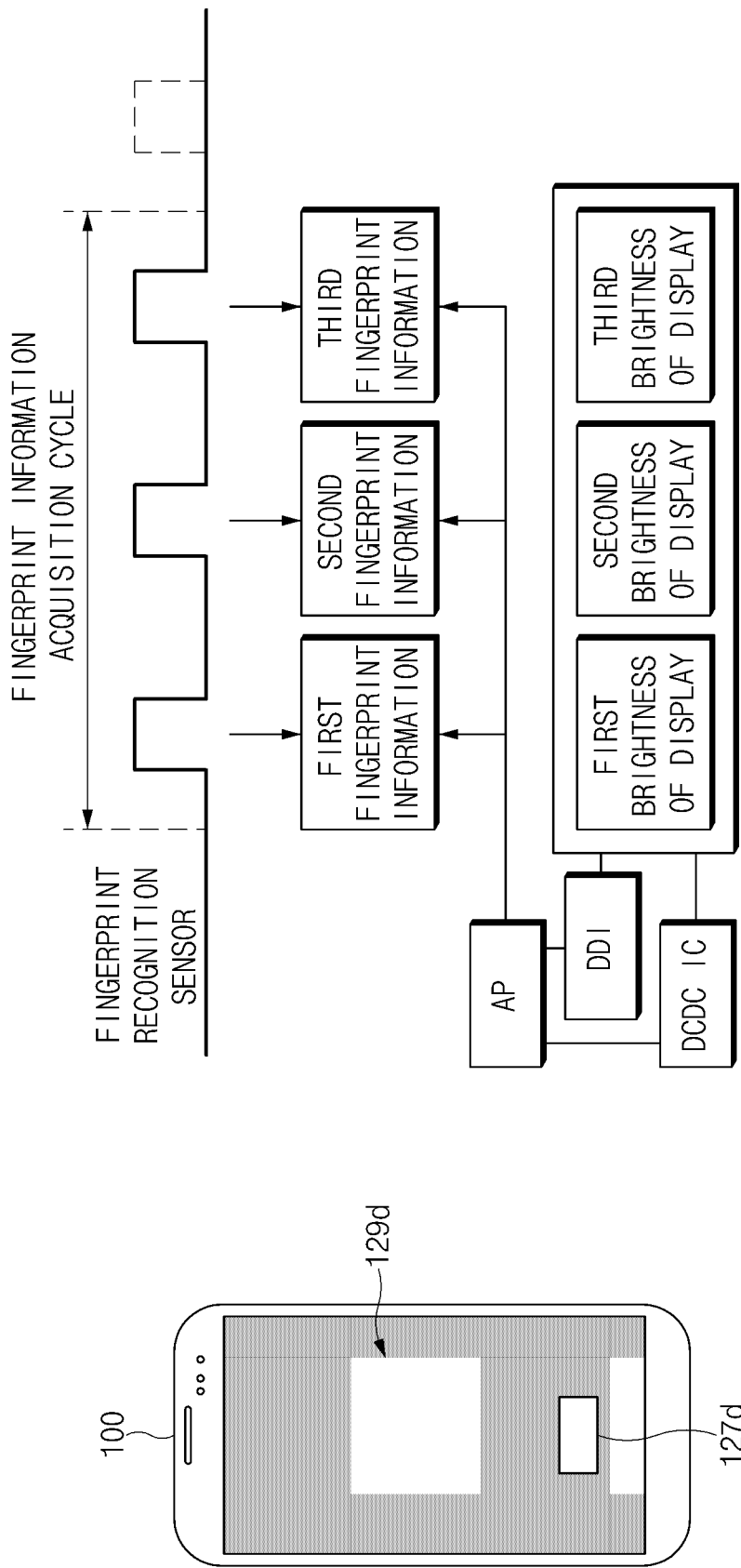
FIG. 4D is a view illustrating a fourth biometric information acquisition form of an electronic device according to an embodiment.

Referring to FIG. 4D, in an embodiment, the processor 140 and/or 150 may control light emission for the first area 127*d* using the first display attribute (e.g., a brightness) in a fourth situation related to the state of the body (e.g., a finger) of the user. The fourth situation, for example, may indicate a normal state, a wet state, or a dry state of the body part the user that contacts at least a portion of the first area 127*d*. The processor 140 and/or 150 may control the light-emitting brightness of the first area 127*d* for the acquisitions of the first to third biometric information of the biometric sensor (at least one of 131*a* to 131*c*) based on the fourth situation information. In an embodiment, the processor 140 and/or 150 may reference a reliability for the first biometric information acquired in an arbitrary state of the body of the user as the fourth situation information. In this regard, when the first area 127*d* emits light at a first brightness (e.g., 420 nits), the processor 140 and/or 150 may determine the reliability of the first biometric information (e.g., a fingerprint image of the first frame) acquired by the biometric sensor (at least one of 131*a* to 131*c*). For example, the processor 140 and/or 150 may determine the reliability of the first biometric information by mapping the first biometric information with a user fingerprint template registered in advance to calculate a concordance rate. If the reliability (or a concordance rate) of the first biometric information exceeds a specific threshold percentage, the processor 140 and/or 150 may determine that body of the user who contacts the first area 127*d* is in a normal state. In this case, the processor 140 and/or 150 may maintain the light emission of the first area 127*d* at the first brightness (e.g., 420 nits) for the acquisitions of the second and third biometric information of the biometric sensor (at least one of 131*a* to 131*c*). When the reliability of the first biometric information is not more than the threshold percentage, the processor 140 and/or 150 may determine that the body of the user is in a wet state or a dry state, and may support acquisitions of the second and third biometric information of the biometric sensor (at least one of 131*a* to 131*c*) by controlling the light emission of the first area 127*d* to a second brightness (e.g., 600 nits) that is higher than the first brightness.

In an embodiment, the processor 140 and/or 150 may control the biometric sensor (at least one of 131*a* to 131*c*) to further perform acquisition of fourth biometric information. For example, when the biometric information (e.g., the second and third biometric information) acquired in a state in which the first area 127*d* emits light at the second brightness (e.g., 600 nits) fails to satisfy the reliability, the processor 140 and/or 150 may control performance of acquisition of the fourth biometric information of the biometric sensor (at least one of 131*a* to 131*c*). In this operation, the processor 140 and/or 150 may control the light emission of the first area 127*d* to a third brightness (e.g., 700 nits) that is higher than the second brightness. In various embodiments, the reliability of the processor 140 and/or 150 for the biometric information may be determined by the biometric sensor (at least one of 131*a* to 131*c*) equipped with a calculation function.

Figure 4E:
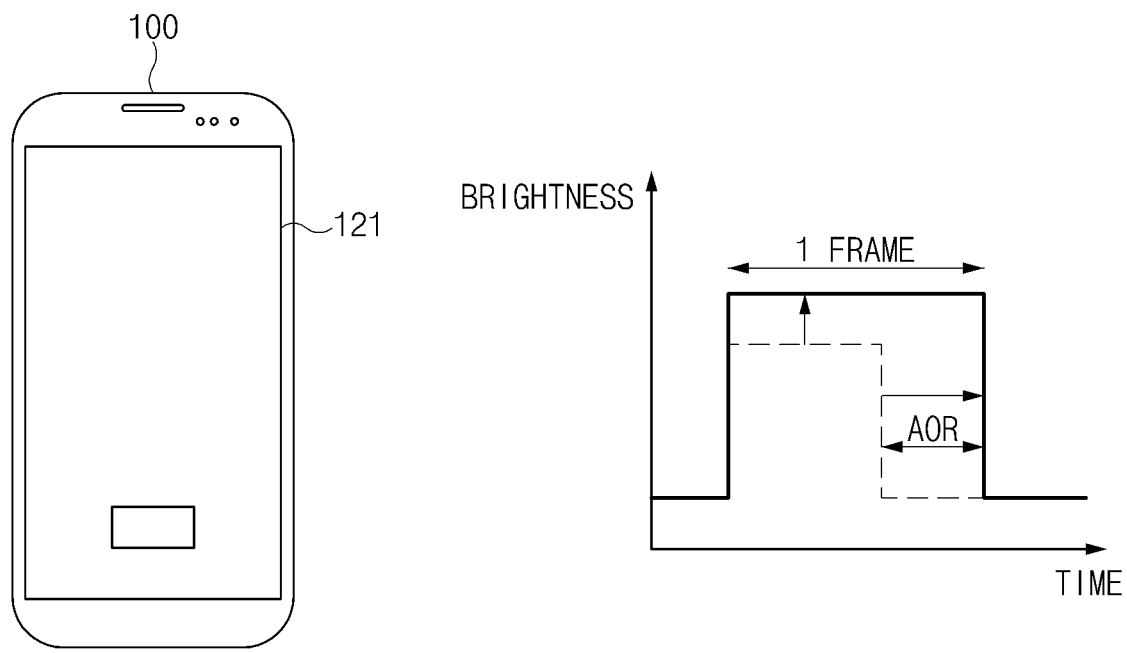
FIG. 4E is a view illustrating a fifth biometric information acquisition form of an electronic device according to an embodiment.

Referring to FIG. 4E, the processor 140 and/or 150 may implement the brightness differential without executing a black state or a low-gradation state using the second display attribute (e.g., a gradation) for the above-mentioned second area 129*a*, 129*b*, 129*c*, and 129*d* (see FIGS. 4A to 4D), and may control the high-brightness light emission throughout the entire area of the screen area 121 of the display 120.

In an embodiment, the processor 140 and/or 150 may control the high-brightness light emission of the screen area 121 by controlling at least one pixel corresponding to the screen area 121 by using the third display attribute (e.g., supply power). For example, the processor 140 and/or 150 may increase the light emission brightness by applying a high voltage to at least one pixel corresponding to the screen area 121 during a cycle in which an image of a first frame is output by the display 120. Further, the processor 140 and/or 150 may control the high-brightness light emission of the screen area 121 by performing a control of minimizing an AMOLED off ratio (AOR) that is present on the cycle in which the image of the first frame is output. The AOR may mean a section (or a ratio of the cycle for restricting the supply of electric power to the display 120 for a specific period of time on the cycle in which the display 120 outputs an image in unit of a frame. The processor 140 and/or 150 may increase a light emission time period of a pixel corresponding to the screen area 121 by minimizing the AOR. The light emission time period and the brightness of the pixel are proportional to each other, and the processor 140 and/or 150 may realize the high-brightness light emission by increasing the light emission time period of the pixel corresponding to the screen area 121. In an embodiment, the processor 140 and/or 150 may perform a power/voltage control for the pixel of the screen area 121 at a frame image output cycle of the display 120.

In various embodiments, the processor 140 and/or 150 may control light emission colors of the first areas 127*a*, 127*b*, 127*c*, and 127*d* corresponding to the biometric information sensing area by using another display attribute (e.g., a color). In this regard, because the life span of the blue element of the RGB elements 226, 227, and 228 (see FIG. 2) is shorter than those of the other elements, the light emission color of the pixel may tend to be transited to a yellow color (red+green) when the display 120 continues to be driven. Accordingly, an afterimage due to a color deviation may be generated between the first areas 127*a*, 127*b*, 127*c*, and 127*d* and the second areas 129*a*, 129*b*, 129*c*, and 129*d* corresponding to the non-sensing area. In order to restrain an afterimage from being generated between the first areas 127*a*, 127*b*, 127*c*, and 127*d* and the second areas 129*a*, 129*b*, 129*c*, and 129*d*, the processor 140 and/or 150 may control the light emission colors of the first areas 127*a*, 127*b*, 127*c*, and 127*d* such that the light emission colors of the first areas 127*a*, 127*b*, 127*c*, and 127*d* are similar to the colors of the second areas 129*a*, 129*b*, 129*c*, and 129*d* (or colors that reduce a color deviation).

An electronic device according to various embodiments includes a display including a plurality of pixels, a biometric sensor disposed below a biometric information sensing area of the display, and at least one processor electrically connected to the display and the biometric sensor.

According to various embodiments, the processor may, when an event related to sensing of biometric information is received, control a first pixel group corresponding to the biometric information sensing area in a high brightness mode (HBM), and maintain or convert a second pixel group corresponding to at least a partial area of a surrounding area of the first pixel group in or to a black state or a low load state while the first pixel group is controlled in the HBM.

According to various embodiments, the processor may control the first pixel group in the HBM by applying high electric power to the first pixel group.

According to various embodiments, the processor may control the second pixel group in the lower load state by applying a specific gradation value to the second pixel group.

According to various embodiments, the processor may allow the first pixel group to emit light at a brightness at which biometric information is sensed, by maintaining or converting the second pixel group in or to the black state or the low load state to realize a load effect in the first pixel group.

According to various embodiments, the processor may acquire a signal for an object that approaches the biometric information sensing area, generate image information corresponding to the object based on at least a part of the signal, and perform authentication of the object based on the image information.

According to various embodiments, the electronic device may further include an illumination sensor configured to detect an intensity of illumination for a surrounding area.

According to various embodiments, the processor may, when an intensity of illumination of a surrounding area of the electronic device exceeds a specific value, control the first pixel group in the HBM.

According to various embodiments, the processor may control minimization of an AMOLED off ratio (AOR) related to driving of the display while the first pixel group is controlled in the HBM.

An electronic device according to various embodiments includes a display having a biometric information sensing area at least a portion thereof, a biometric sensor disposed below the biometric information sensing area of the display, and a processor electrically connected to the display and the biometric sensor, and the processor is configured to control the display including the biometric information sensing area by using a first display attribute, detect an approach of an object for the biometric information sensing area while the display is controlled by using the first display attribute, in response to the detection, control at least a partial area of a surrounding area of the biometric information sensing area of the display by using a second display attribute, acquire a signal corresponding to an object that approaches the biometric information sensing area by using the biometric sensor while the at least a partial area is controlled by using the second display attribute, and perform authentication of the object at least partially based on the signal.

According to various embodiments, the processor may further control at least a partial area of the biometric information sensing area by using a third display attribute in response to the detection, and acquire the signal while the at least a partial area of the biometric information sensing area is further controlled by using the third display attribute.

According to various embodiments, the processor may control a brightness or a gradation of the display, or an intensity of electric power supplied to the display as at least a part of control using the first display attribute, the second display attribute, or the third display attribute.

According to various embodiments, the processor may generate image information corresponding to the object based on at least a part of the signal, and perform the authentication based on at least a part of the image information.

According to various embodiments, the processor may at a part of the operation of generating the image information, when the image information satisfies the specific condition, control at least a part of the biometric information sensing area further by using the first display attribute.

According to various embodiments, the processor may acquire a second signal corresponding to the object while the at least a partial area of the biometric information sensing area is controlled further by using the first display attribute, generate a second piece of image information corresponding to the object based on the second signal, and extruding the generated image information and performing the authentication based on the second image information.

According to various embodiments, the electronic device may further include an illumination sensor configured to detect an intensity of illumination.

According to various embodiments, the processor may, in relation to the operation of performing the authentication, perform a control using the second display attribute or the third display attribute based on at least a part of the intensity of illumination detected by using the illumination sensor.

According to various embodiments, the processor may synchronize an operation time of the biometric sensor for acquiring the signal and an operation time at which at least one pixel corresponding to the biometric information sensing area emits light.

According to various embodiments, the processor may adjust an AMOLED off ratio (AOR) related to driving of the display while at least a partial area of the biometric information sensing area is controlled by using the third display attribute.

According to various embodiments, the processor may, as at least a part of the operation of controlling the display by using the first display attribute, display a user interface at least a portion of the biometric information sensing area, and as at least a part of the operation of controlling the display by using the second display attribute, control a surrounding area of the user interface.

An electronic device according to various embodiments includes a display having a biometric information sensing area at least a portion thereof, a biometric sensor disposed below the biometric information sensing area of the display, and a display driver IC configured to control the display, and a processor electrically connected to the display, the biometric sensor, and the display driver IC, and the processor is configured to acquire a user input through the biometric information sensing area, identify situation information related to the electronic device, when the situation information satisfies a first condition, set at least a partial area of the display to a first display attribute by using the display driver IC, and acquire fingerprint information corresponding to the user input based on the first display attribute by using the biometric sensor, when the situation information satisfies a second condition, set at least a partial area of the display as a first display attribute by using the display driver IC, and acquire the fingerprint information corresponding the user input based on the second display attribute by using the biometric sensor.

According to various embodiments, the electronic device may further include an illumination sensor or a temperature sensor.

According to various embodiments, the processor may, as at least a part of the situation information, identify an intensity of illumination acquired through the illumination sensor or a temperature acquired through the temperature sensor.

According to various embodiments, the processor may, as at least a part of the operation of identifying the situation information, identify reception of a request for acquiring the biometric information.

An electronic device according to various embodiments includes a display including a plurality of pixels, a biometric sensor disposed below the display such that contacts within a biometric sensing area of the display are detectable by the biometric sensor through the display and at least one processor electrically connected to the display and the biometric sensor.

According to various embodiments, the processor may, when a touch input is detected to the display within the biometric sensing area, increase a brightness of a first pixel group within the biometric sensing area to a first brightness level, and execute at least one of maintaining and changing display of a second pixel group outside the biometric sensing area, wherein the at least one of maintaining and changing display of the second pixel group includes one of: executing a black state in which display through the second pixel group is disabled, and changing a display attribute for the second pixel group such that a load on the second pixel group is reduced.

According to various embodiments, wherein increasing the brightness of the first pixel group includes increasing an amount of electric power supplied to the first pixel group.

According to various embodiments, wherein the load on the second pixel group is reduced by changing a specific gradation value of display for the second pixel group.

According to various embodiments, the electronic device may further include a display driver integrated circuit (IC) disposed adjacent to the biometric sensing area of the display, wherein the display is further configured such that voltage supplied to regions of the display is reduced according to a distance a particular region is disposed from the display driver IC, and wherein the at least one of maintaining and changing display of the second pixel group to the executed black state or the changed display attribute causes increase of the brightness of the first pixel group based on the reduced voltage.

According to various embodiments, the processor may, detect a signal indicating an approach of an object to the biometric sensing area of the display, retrieve previously-stored image information corresponding to the object based on at least a part of the signal and perform authentication of the object by comparison with the retrieved image information.

According to various embodiments, the electronic device may further include an illumination sensor configured to detect an intensity of illumination, wherein the brightness of a first pixel group is increased to the first brightness level when an intensity of environmental illumination as detected by the illumination sensor exceeds a prespecified value.

According to various embodiments, the processor may, control minimization of an AMOLED off ratio (AOR) for the display while the brightness of the first pixel group is increased to the first brightness level.

An electronic device according to various embodiments includes a display, a biometric sensor disposed below the display such that contacts within a biometric sensing area of the display are detectable by the biometric sensor through the display and a processor electrically connected to the display and the biometric sensor.

According to various embodiments, the processor may, alter display within the biometric sensing area to use a first display attribute, responsive to detecting an approach of an object to the biometric sensing area while the first display attribute is used, altering at least a partial display area external to the biometric sensing area to use a second display attribute, detect a signal corresponding to the object using the biometric sensor while the second display attribute is applied to the at least the partial area and authenticate the object based at least on the detected signal.

According to various embodiments, the processor may, responsive to detecting the signal, altering display within at least a partial area of the biometric sensing area to use a third display attribute, wherein the signal is detected while display within the at least partial area of the biometric sensing area is altered using the third display attribute.

According to various embodiments, wherein the first display attribute, the second display attribute and the third display attribute each include at least one of modifying a brightness, modifying a gradation, and modifying a level of electric power supplied to the display.

According to various embodiments, the processor may, retrieve previously-stored image information corresponding to the object based on at least a part of the detected signal and perform authentication by comparison with at least a part of the retrieved image information.

According to various embodiments, wherein when the image information is retrieved, display within the biometric sensing area is altered to use the first display attribute if the image information satisfies a specific condition.

According to various embodiments, the processor may, detect a second signal corresponding to the object while the first display attribute is applied to the at least the partial area, retrieve a second image information corresponding to the object based on the second signal, wherein authenticating the object is further performed using the second image information.

According to various embodiments, the electronic device may further include an illumination sensor configured to detect an intensity of illumination, the processor may, apply the second display attribute or the third display attribute to a region of the display based at least in part of the intensity of illumination detected by the illumination sensor.

According to various embodiments, wherein a time at which the signal corresponding to the object is detected is synchronized to a time at which at least one pixel disposed within the biometric sensing area is controlled to emit light.

According to various embodiments, the processor may, adjust an AMOLED off ratio (AOR) for the display while the at least the partial area of the biometric sensing area is altered to use the third display attribute.

According to various embodiments, wherein altering display within the biometric sensing area to use the first display attribute further includes display a graphic element within at least a portion of the biometric sensing area, and wherein the partial display area external to the biometric sensing area at least partially surrounds the biometric sensing area.

An electronic device according to various embodiments includes a display, a sensor, a biometric sensor disposed below the display such that contacts within a biometric sensing area of the display are detectable by the biometric sensor through the display, a display driver integrated circuit (IC) configured to control the display and a processor electrically connected to the display, the biometric sensor, and the display driver IC.

According to various embodiments, the processor may, detect a user input through the biometric sensing area, identify situation information using the sensor, when the situation information satisfies a first condition, set at least a portion of the display to use a first display attribute by the display driver IC, and acquire a fingerprint from the detected the user input using the biometric sensor based on the first display attribute, and when the situation information satisfies a second condition, set the at least the portion of the display to use a second display attribute by the display driver IC, and acquire the fingerprint from the detected user input using the biometric sensor based on the second display attribute.

According to various embodiments, wherein the sensor includes at least one of an illumination sensor and a temperature sensor, and wherein identifying the situation information further comprises at least one of detecting an intensity of illumination through the illumination sensor and detecting a present temperature through the temperature sensor.

According to various embodiments, wherein the situation information is identified responsive to detecting a request to acquire the biometric information.

According to various embodiments, an electronic device may include a display including a plurality of pixels, a biometric sensor disposed below the display such that contacts within a biometric sensing area of the display are detectable by the biometric sensor through the display, and at least one processor electrically connected to the display and the biometric sensor, wherein the processor is configured to control the display to display a screen including at least one object for scanning a finger print of a user on the biometric sensing area of the display, when a touch input is detected on the at least one object at the biometric sensing area of the display, control the display to emit light with predetermined brightness by using a first pixel group within the biometric sensing area for scanning the finger print, and display at least one object and/or background by using pixels within an area other than the biometric sensing area, wherein the first pixel group within the biometric sensing area emit light brighter than any pixel within an area other than the biometric sensing area when the touch input is detected on the at least one object at the biometric sensing area of the display.

According to various embodiments, wherein the background by using pixels within an area other than the biometric sensing area comprises substantial black background.

According to various embodiments, wherein the displaying at least one object and/or background by using pixels within an area other than the biometric sensing area comprising displaying substantial black background without at least one object.

According to various embodiments, wherein a color of the background has been changed to substantial black for scanning the finger print of the user prior to emitting light with the predetermined brightness by using the first pixel group within the biometric sensing area.

Figure 5A:
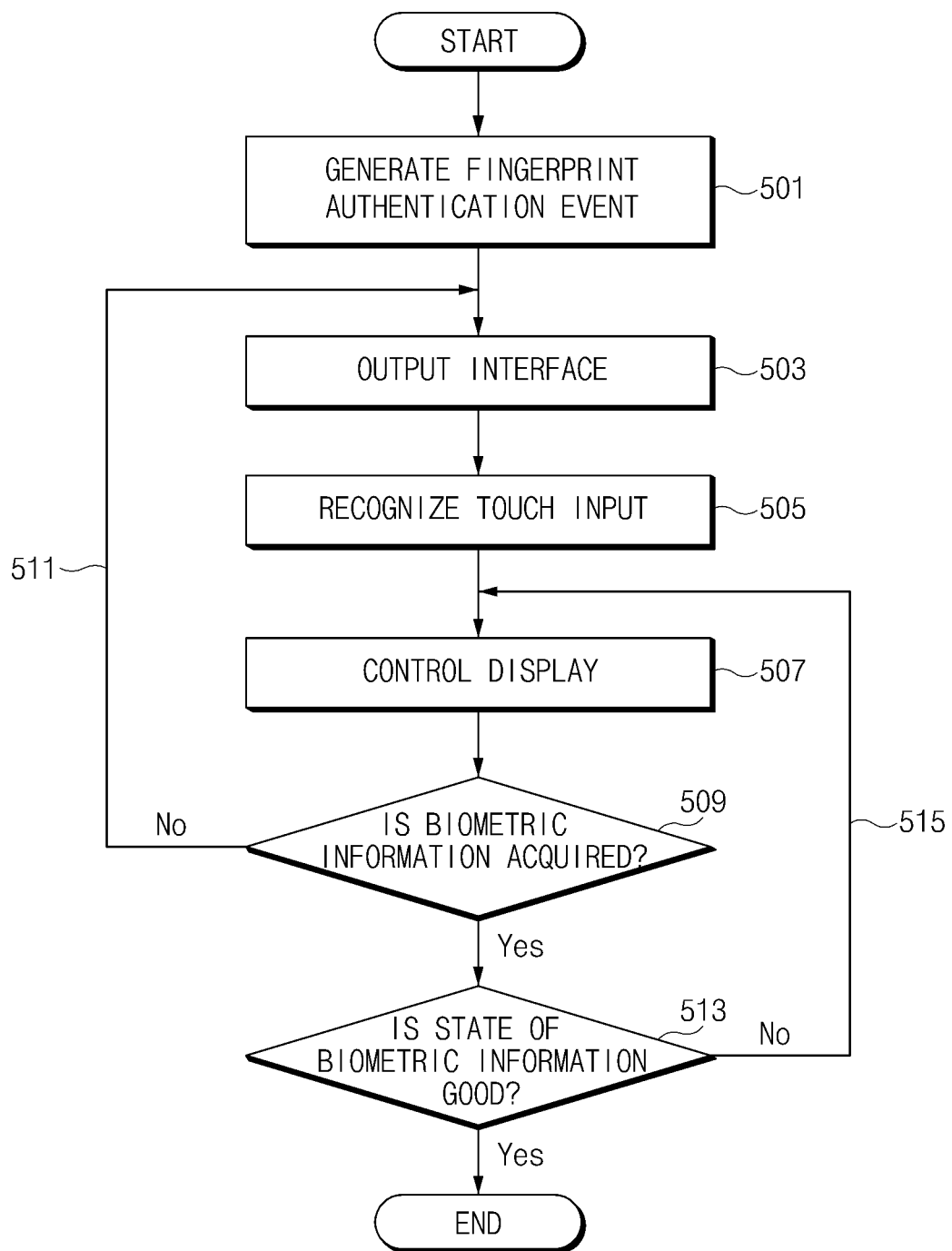
FIG. 5A is a view illustrating a biometric information acquisition flow of an electronic device according to an embodiment.

FIG. 5A is a view illustrating a biometric information acquisition flow of an electronic device according to an embodiment.

Referring to FIG. 5A, in operation 501, the electronic device 100 (see FIG. 3A or 3B) may perform biometric authentication (e.g., a fingerprint authentication) for a user according to a specific operation environment. If an event related to, for example, release of a locked screen, electronic payment based price payment, or financial trading through mobile banking, occurs, the electronic device 100 may request authentication using at least a portion (e.g., a finger) of the body of the user.

In operation 503, the display 120 (see FIG. 3A or 3B) of the electronic device 100 may output an interface (i.e., a visual display element or icon) that provides visual guidance identifying an appropriate input area for biometric information (e.g., fingerprint information), displayed to at least a portion of the screen area in response to the event. In this operation, the screen area of the display 120 may operate in a state in which light is emitted at a specific brightness (i.e., a first brightness) according to a control of the processor 140 and/or 150 (see FIG. 3A or 3B) using the first display attribute (e.g., the brightness). In an embodiment, the interface may also be displayed having a specific ratio relative to the screen area of the display 120, and may include various visual shapes and designs, such as a rectangular shape, an elliptical shape, or a fingerprint pattern.

In operation 505, the processor 140 and/or 150 (see FIG. 3B) may detect a user input at least an area of the displayed interface (i.e., the element or icon). For example, the processor 140 and/or 150 may receive a signal corresponding to the user input from the touch sensor 133 (FIG. 3A or 3B), and determine that an input is being applied to an area of the interface that is maintained for a time exceeding a pre-specified period of time. Accordingly, the input may be determined to be a user input relevant to the requested biometric authentication.

In operation 507, the processor 140 and/or 150 may alter at least some pixels of the display 120 using the second display attribute (e.g., a gradation) in response to the user input. For example, the processor 140 and/or 150 may alter at least one pixel corresponding to a screen area (hereinafter, referred to as a non-sensing area) outside the interface area such that the at least one pixel takes on a specific gradation value. As a result, the non-sensing area may be switched to a black state or a low gradation state. In this case, based on the above-described load effect, the brightness of the interface area may be improved given that it is less influenced by the power/voltage drop phenomenon described above.

According to an embodiment, in operation 507, the processor 140 and/or 150 may further control of synchronizing a sensing timing of the biometric sensor (at least one of 131a to 131c of FIG. 2) and at least one of a light emission initiation timing corresponding to the interface area and a light emission duration. Further, when the intensity of illumination for a surrounding area of the electronic device 100 exceeds a specific value, the processor 140 and/or 150 may further control the HBM function of the display 120 by applying a high power to at least a portion of the interface area by using the third display attribute (e.g., supply power).

In various embodiments, a control of the display 120 of the processor 140 and/or 150 such as operation 507 may be performed based on situation information related to an operation environment of the electronic device 100. For example, the processor 140 and/or 150 may perform a control of the display 120 based on situation information on at least one of a first situation in which a specific application program (e.g., a mobile banking application or an electronic payment application) is executed, a second situation in which the intensity of illumination of the electronic device 100 satisfies a specific condition (e.g., more than a threshold value), and a third situation in which a locked screen releasing event of the electronic device 100 occurs. Further, the processor 140 and/or 150 may perform a control of the display 120 in a situation in which the temperature sensed from the electronic device 100 satisfies a specific condition (e.g., more than a specific temperature). When acquiring information on at least one of the first to third situations, the processor 140 and/or 150 may control high-brightness light emission of the interface area (or a biometric information sensing area) by using at least one display attribute (e.g., a brightness, a gradation, supply power, a color, light emission duration or a light emission initiation timing). In an embodiment, in a situation in which the biometric information is completely acquired or it is unnecessary to acquire the biometric information, the processor 140 and/or 150 may perform a control such that the attribute of the entire area of the screen area of the display 120 is similar while excluding a local control of the screen area of the display 120.

In operation 509, the processor 140 and/or 150 may determine whether the requisite biometric information was detected by the biometric sensor (at least one of 131a to 131c) from the user input. When biometric information (e.g., a fingerprint image or a video) from the biometric sensor (at least one of 131a to 131c) fails to be adequately detected, the processor 140 and/or 150 may prompt a user to re-input the in operation 511 and returning to operation 503 in which the interface is output again.

When biometric information is successfully detected by the biometric sensor (at least one of 131a to 131c), in operation 513, the processor 140 and/or 150 may determine a state of the delivered biometric information. For example the processor 140 and/or 150 may determine a state of the biometric information when calculating a concordance rate by mapping the delivered biometric information (e.g., a fingerprint image) and a user fingerprint template registered in advance. If the concordance rate is less than a specific threshold percentage, the processor 140 and/or 150 may determine that the state of the body (e.g., a finger) of the user is a wet state or a dry state that is not suitable for acquiring the biometric information due to contamination. In this case, the processor 140 and/or 150 may return to an operation of controlling the display 120 in operation 515 and, as in operation 507, repeat the process of increasing the brightness of the interface area to support reacquisition of the biometric information of the biometric sensor.

Figure 5B:
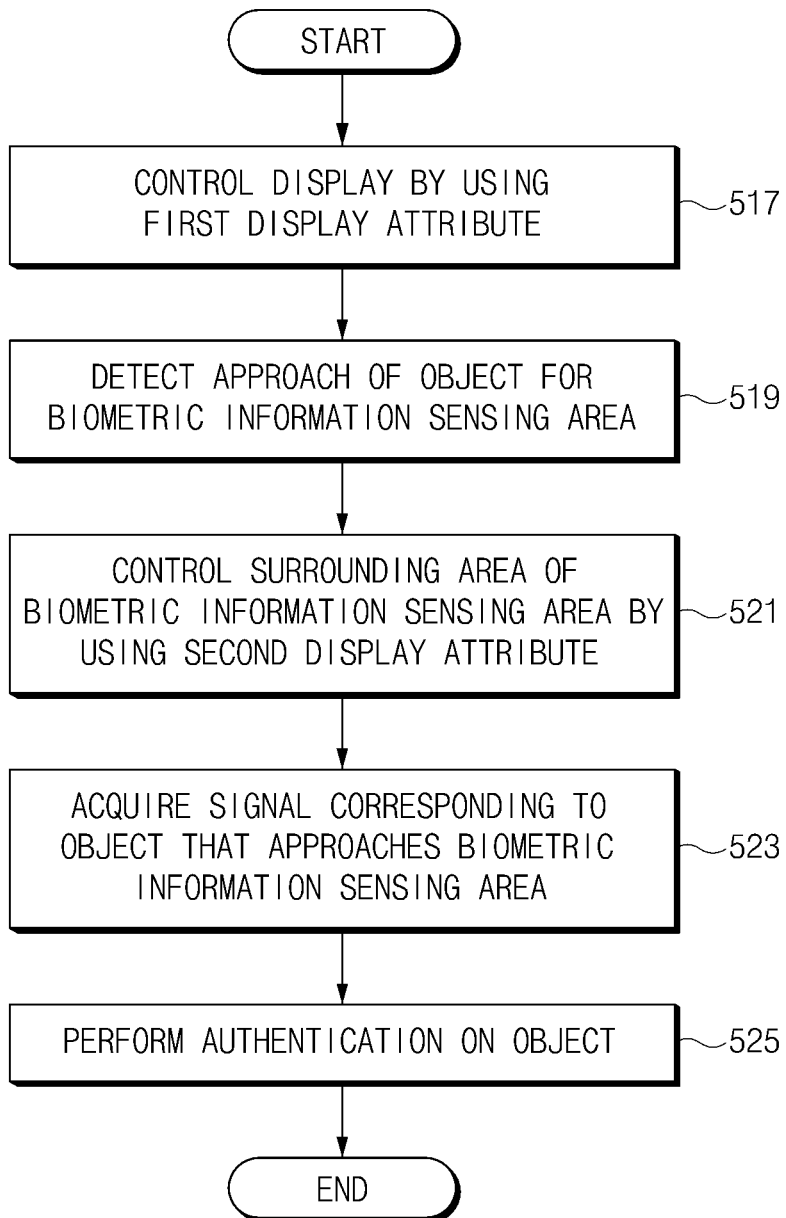
FIG. 5B is a view illustrating a biometric information acquisition method of an electronic device according to an embodiment.

FIG. 5B is a view illustrating a biometric information acquisition method of an electronic device according to an embodiment.

In operation 517, the processor 140 and/or 150 of the electronic device 100 may output an interface corresponding to the biometric information sensing area at least a portion of the screen area of the display 120 in response to detecting an event (e.g., execution of an application accompanied by release of a locked screen, or a successful user authentication) related to a user biometric authentication. The processor 140 and/or 150 may control the screen area of the display 120 including the interface to be displayed at a specific brightness using the first display attribute (e.g., a brightness).

In operation 519, the processor 140 and/or 150 may detect an object (e.g., the body of the user) approaching and/or contacting the interface (i.e., the display element indicating a location of the biometric information sensing area) based on performance (e.g., detection of a signal for an interface area) of a function of the touch sensor 133 (see FIG. 3A to 3B).

When the touch sensor 133 detects an approach or contact of an object for the interface area in operation 519, the processor 140 and/or 150 may modify operation of at least one pixel corresponding to a surrounding area of the interface area (or the biometric information sensing area) in operation 521. For example, the processor 140 and/or 150 may allocate a specific gradation value to at least one pixel corresponding to a surrounding area outside the element by using the second display attribute (e.g., a gradation). In this case, the surrounding area may thus operate in a black state or a low gradation state, by means of the processes described above.

In operation 525, the processor 140 and/or 150 may acquire the biometric information (i.e., a biometric signal or value) corresponding to the authentication object (e.g., the body of the user) that is applied to the interface area using (e.g., sensing of fingerprint information or creation of a fingerprint image) the biometric sensor (at least one of 131a to 131c of FIG. 2). In operation 525, the processor 140 and/or 150 may perform authentication by comparing the acquired biometric signal (i.e., the biometric information) with pre-stored biometric information, such as a fingerprint template stored previously, to calculate a matching rate.

A method for acquiring biometric information of an electronic device using a biometric information sensing area formed in a display area according to various embodiments includes controlling the display including the biometric information sensing area by using a first display attribute, detecting an approach of an object for the biometric information sensing area while the display is controlled by using the first display attribute, in response to the detection, controlling at least a partial area of a surrounding area of the biometric information sensing area of the display by using a second display attribute, acquiring a signal corresponding to an object that approaches the biometric information sensing area by using the biometric sensor while the at least a partial area is controlled by using the second display attribute, and performing authentication of the object at least partially based on the signal.

According to various embodiments, the method may include controlling at least a partial area of the biometric information sensing area by using a third display attribute in response to the detection, and while the at least a partial area of the biometric information sensing area is controlled by using the third display attribute, acquiring a signal corresponding to the object that approaches the biometric information sensing area.

According to various embodiments, at least one of the controlling using the first display attribute, the controlling using the second display attribute, and the controlling using the third display attribute may include controlling a brightness or a gradation of the display, or an intensity of electric power supplied to the display.

According to various embodiments, the method may further include creating first image information corresponding to the object based on at least a part of the signal.

According to various embodiments, the operation of creating the first image information may include, when the image information satisfies a specific condition, controlling the at least a partial area of the biometric information sensing area by further using the first display attribute, acquiring a second signal corresponding to the object while the at least a partial area of the biometric information sensing area is controlled further by using the first display attribute, creating second image information corresponding to the object based on the second signal, and excluding the first image information and performing the authentication based on the second image information.

According to various embodiments, the method may further include detecting an intensity of illumination of a surrounding area of the electronic device.

According to various embodiments, at least one of the controlling using the second display attribute and the controlling using the third display attribute may include performing a control of the display based on at least a part of the intensity of illumination.

According to various embodiments, the method may further include synchronizing an operation time of the biometric sensor and an operation time period for which at least one pixel corresponding to the biometric information sensing area.

According to various embodiments, the controlling using the third display attribute may include adjusting an AMOLED off ratio (AOR) related to driving of the display.

Figure 6A:
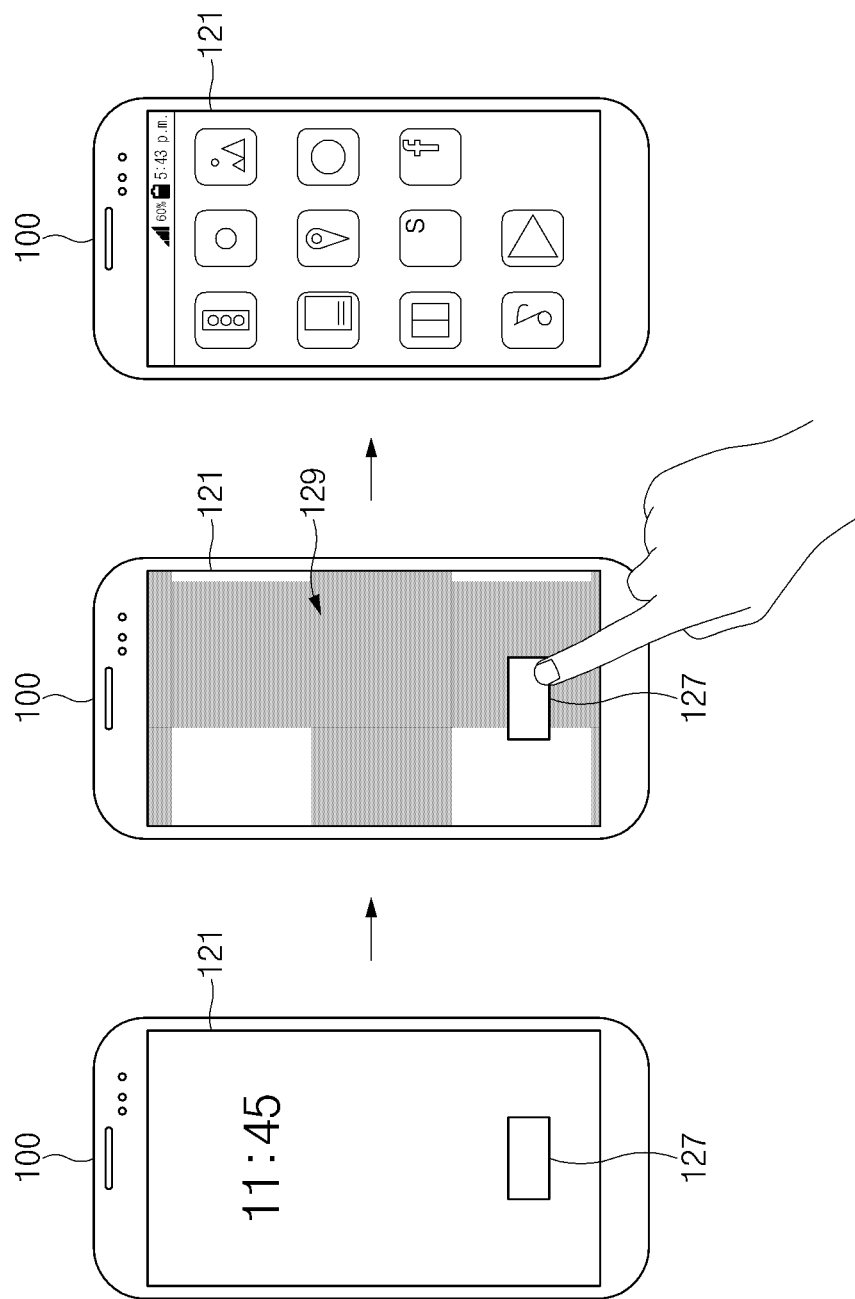
FIG. 6A is a view illustrating an operation platform related to acquisition of biometric information of an electronic device according to an embodiment.
Figure 6B:
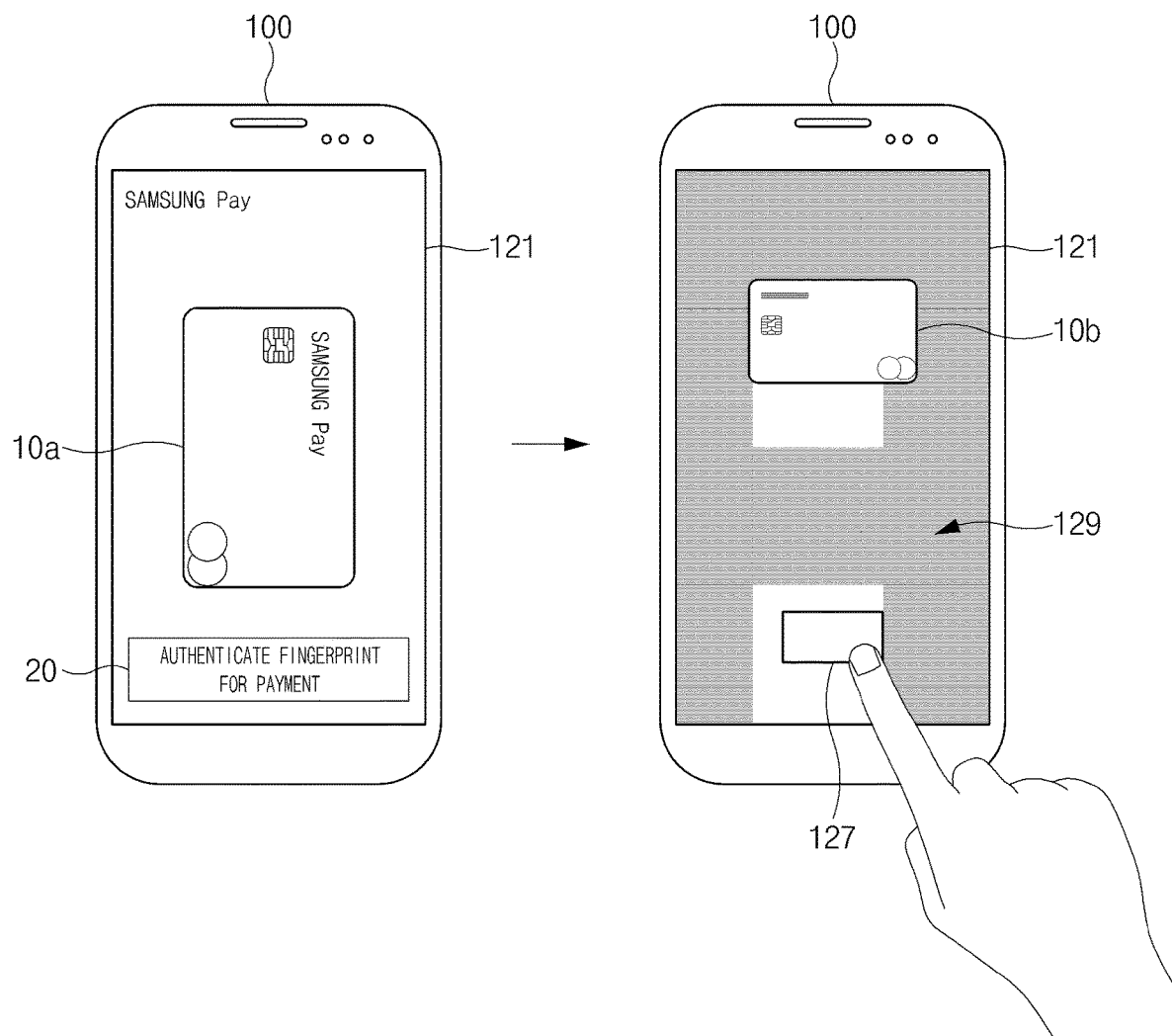
FIG. 6B is a view illustrating another operation platform related to acquisition of biometric information of an electronic device according to an embodiment.
Figure 6C:
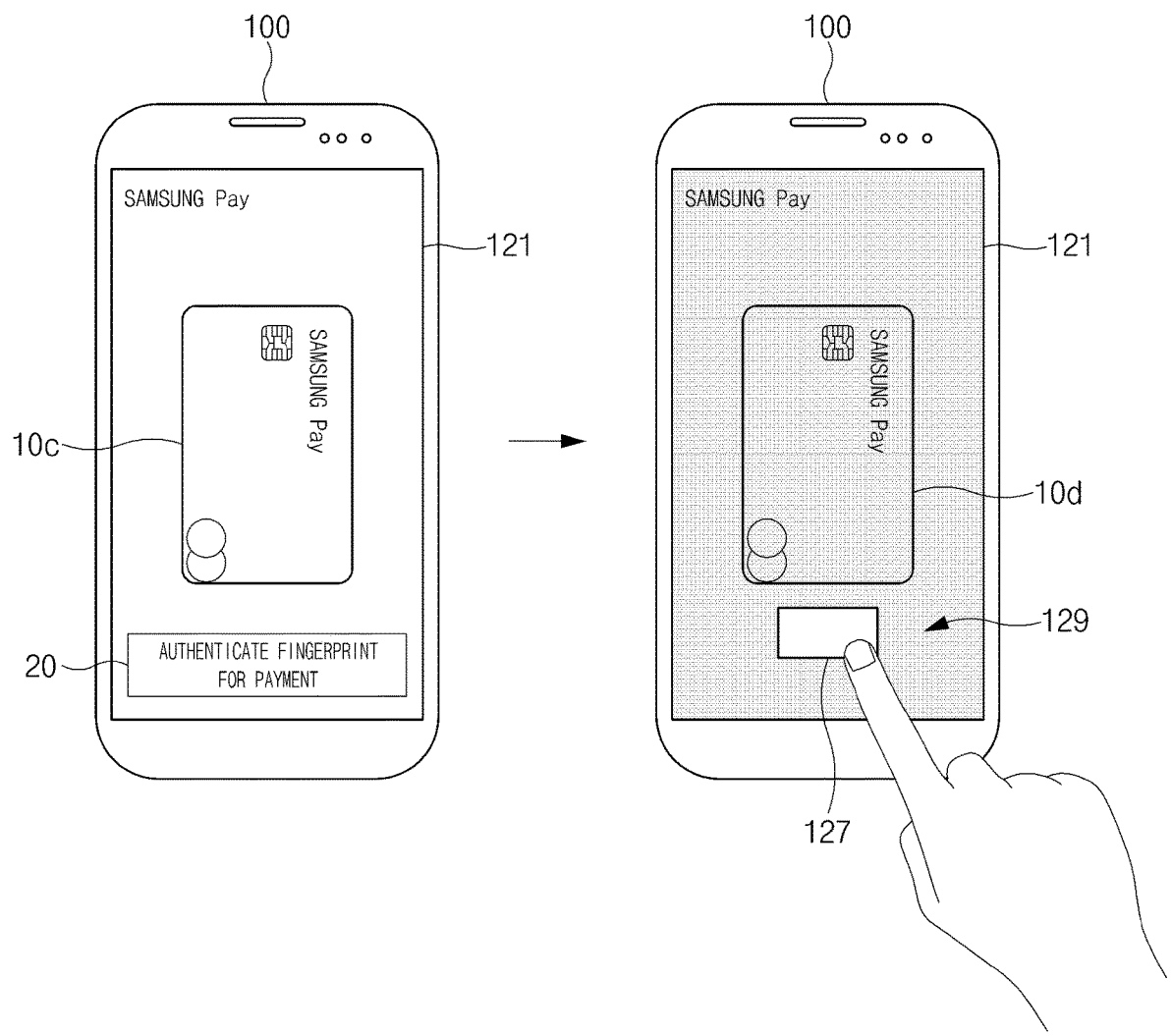
FIG. 6C is a view illustrating another operation platform related to acquisition of biometric information of an electronic device according to an embodiment.

FIGS. 6A to 6C are views illustrating various operation platforms related to acquisition of biometric information of an electronic device according to an embodiment.

Referring to FIG. 6A, when an event (e.g., a manipulation of a physical key (a power key or a volume key) disposed in an area of the electronic device 100) related to release of a locked screen occurs on the electronic device 100, the processor 140 and/or 150 (see FIG. 3A or 3B) may execute a specific user authentication system (e.g., a biometric authentication system). The processor 140 and/or 150 may output an interface 127 that functions as a guide for a biometric information input area in at least an area of the screen area 121 of the display. In this operation, the screen area 121 of the display may be in a state in which light is emitted at a specific brightness according to a control of the processor 140 and/or 150 using the first display attribute (e.g., the brightness).

According to an embodiment, the processor 140 and/or 150 may control driving of the display 120 (see FIG. 3A or 3B) after detecting a user input (e.g., a touch by a specific finger) applied to at least a portion of the area for the interface 127 (e.g., a first area). For example, when the user input is applied while exceeding a specific time, the processor 140 and/or 150 may control a gradation for the screen area 121 of the display 120 by using the second display attribute (e.g., a gradation) at the excess time point or within a range of a specific time from the excess. The processor 140 and/or 150 may control a gradation value of at least one pixel corresponding to the second area 129 such that the second area 129 of the screen area 121 of the display 120, except for the first area for the interface 127, is in a black state or a low gradation state. In this case, the first area for the interface 127 may emit light at a high brightness based on the above-mentioned load effect. In this operation, the processor 140 and/or 150 may control at least one of a light emission initiation timing and a light emission duration of at least one pixel corresponding to the first area for the interface 127 by using another display attribute (e.g., a light emission time) and may further perform a control of synchronizing the at least one of the light emission initiation timing and the light emission duration of the at least one pixel with a sensing timing of the biometric sensor (at least one of 131a to 131c of FIG. 2).

In an embodiment, the biometric sensor (at least one of 131a to 131c) may acquire biometric information (e.g., a fingerprint image) of the user a specific number of times (e.g., three times or more) for a specific sensing time range (e.g., 60 to 90 ms). The processor 140 and/or 150 may analyze the biometric information of the user acquired by the biometric sensor (at least one of 131a to 131c) by mapping the biometric information of the user acquired by the biometric sensor (at least one of 131a to 131c) with a user fingerprint template stored in the memory 110 (see FIG. 3A or 3B) in advance. When at least one piece of the acquired biometric information coincides with the fingerprint template at a specific ratio or more, the processor 140 and/or 150 may release the locked screen of the electronic device 100.

Referring to FIG. 6B, the processor 140 and/or 150 may execute user authentication (e.g., a biometric authentication) in response to execution of an application program supporting an electronic payment function and/or a financial trade function of the electronic device 100. In this case, one or more first contents 10a related to the electronic payment or the financial trade (e.g., a payment account represented by the displayed credit card) and second contents 20 related to a request for a biometric authentication (e.g., a confirmation for requesting biometric authentication) may be displayed on the screen area 121 of the display 120. In this operation, the processor 140 and/or 150 may control light emission of the screen area 121 including the first contents 10a and the second contents 20 by using the first display attribute (e.g., a brightness). In an embodiment, if a user input (e.g., a touch) is applied onto the second contents 20, or a specific period of time elapses from the display of the second contents 20, the processor 140 and/or 150 may alter the display 120. For example, the processor 140 and/or 150 may display a third content 10b generated by reducing the first contents 10a using a specific reduction ratio and an interface element 127 which provides a visual guide for input of biometric information of the user at least a portion of the screen area 121. In an embodiment, in the screen area 129, except for the third contents 10b and the interface 127, at least one pixel such as the first pixel 125 corresponding to a control of the processor 140 and/or 150 using the second display attribute (e.g., a gradation) may be altered to display a black state. In this case, the area of the interface 127 may emit light at a high brightness leveraging the load effect. The processor 140 and/or 150 may execute a series of processes for processing the electronic payment and/or the financial trade according to successful authentication of the biometric information (e.g., fingerprint information), based on a match with a user fingerprint stored in advance.

Further, as illustrated in FIG. 6C, after a user input is applied onto the second contents 20, or a specific period of time elapses from the display of the second contents 20, the processor 140 and/or 150 may perform a control by using the second display attribute (e.g., a gradation) for the screen area 121 that emits light at specific brightness. For example, the processor 140 and/or 150 may control at least one pixel corresponding to the screen area, except for the interface 127, in a low gradation state. The gradation value caused by the control of the low gradation state may be variably controlled to correspond to a bright adjusting function (e.g., a function of automatically adjusting the brightness of the screen of the display 120 according to the intensity of illumination detected by the illumination sensor) of the electronic device 100. In an embodiment, the processor 140 and/or 150 may perform a control such that the screen area 129, on which a lower gradation has been performed, is in a black state, at a time point at which the body of the user contacts the area of the interface 127 for a specific period of time or more and the sensing of the biometric sensor (at least one of 131a to 131c) is performed. Accordingly, at the time point of the sensing of the biometric sensor (at least one of 131a to 131c), the area of the interface 127 may emit light at a high brightness due to the above-mentioned load effect. When the performance of the function (e.g., sensing) of the biometric sensor (at least one of 131a to 131c) is ended or paused, the processor 140 and/or 150, for example, may restore the black state of the screen area 129 to a low gradation state by a gradation value corresponding to the brightness adjusting function of the electronic device 100. Based on this, the processor 140 and/or 150 may restrain generation of deviation for a mutual area by maintaining the life spans of the pixels corresponding to the area of the interface 127 and the screen area 129.

Figure 7:
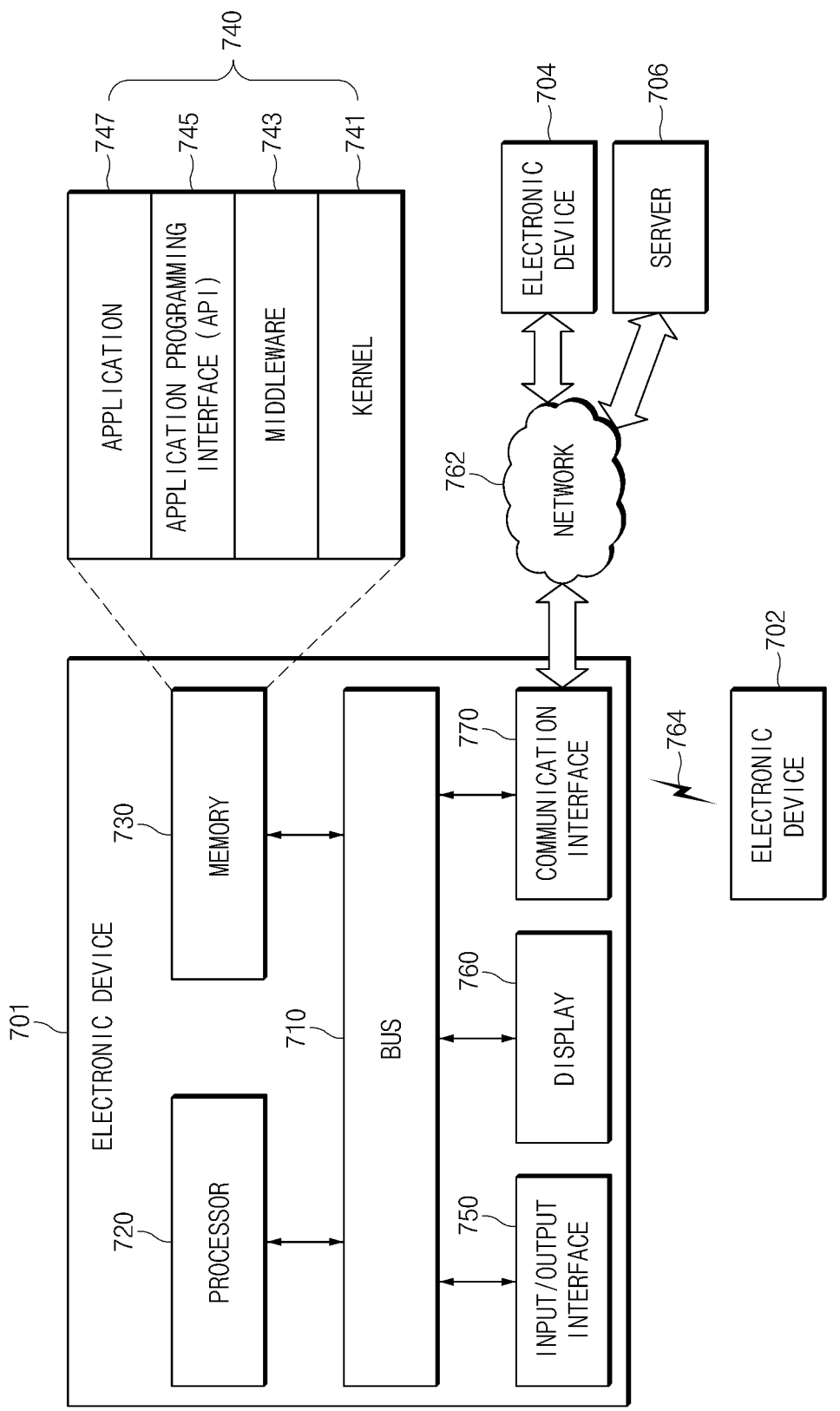
FIG. 7 is a drawing illustrating an electronic device in a network environment according to an embodiment.

FIG. 7 is a drawing illustrating an electronic device in a network environment according to an embodiment.

An electronic device 701 in a network environment 700 according to various embodiments of the present disclosure will be described with reference to FIG. 7. The electronic device 701 may include a bus 710, a processor 720, a memory 730, an input/output interface 750, a display 760, and a communication interface 770. In various embodiments of the present disclosure, at least one of the foregoing elements may be omitted or another element may be added to the electronic device 701.

The bus 710 may include a circuit for connecting the above-mentioned elements 710 to 770 to each other and transferring communications (e.g., control messages and/or data) among the above-mentioned elements.

The processor 720 may include at least one of a central processing unit (CPU), an application processor (AP), or a communication processor (CP). The processor 720 may perform data processing or an operation related to communication and/or control of at least one of the other elements of the electronic device 701.

The memory 730 may include a volatile memory and/or a nonvolatile memory. The memory 730 may store instructions or data related to at least one of the other elements of the electronic device 701. According to an embodiment of the present disclosure, the memory 730 may store software and/or a program 740. The program 740 may include, for example, a kernel 741, a middleware 743, an application programming interface (API) 745, and/or an application program (or an application) 747. At least a portion of the kernel 741, the middleware 743, or the API 745 may be referred to as an operating system (OS).

The kernel 741 may control or manage system resources (e.g., the bus 710, the processor 720, the memory 730, or the like) used to perform operations or functions of other programs (e.g., the middleware 743, the API 745, or the application program 747). Furthermore, the kernel 741 may provide an interface for allowing the middleware 743, the API 745, or the application program 747 to access individual elements of the electronic device 701 in order to control or manage the system resources.

The middleware 743 may serve as an intermediary so that the API 745 or the application program 747 communicates and exchanges data with the kernel 741.

Furthermore, the middleware 743 may handle one or more task requests received from the application program 747 according to a priority order. For example, the middleware 743 may assign at least one application program 747 a priority for using the system resources (e.g., the bus 710, the processor 720, the memory 730, or the like) of the electronic device 701. For example, the middleware 743 may handle the one or more task requests according to the priority assigned to the at least one application, thereby performing scheduling or load balancing with respect to the one or more task requests.

The API 745, which is an interface for allowing the application 747 to control a function provided by the kernel 741 or the middleware 743, may include, for example, at least one interface or function (e.g., instructions) for file control, window control, image processing, character control, or the like.

The input/output interface 750 may serve to transfer an instruction or data input from a user or another external device to (an)other element(s) of the electronic device 701. Furthermore, the input/output interface 750 may output instructions or data received from (an)other element(s) of the electronic device 701 to the user or another external device.

The display 760 may include, for example, a liquid crystal display (LCD), a light-emitting diode (LED) display, an organic light-emitting diode (OLED) display, a microelectromechanical systems (MEMS) display, or an electronic paper display. The display 760 may present various content (e.g., a text, an image, a video, an icon, a symbol, or the like) to the user. The display 760 may include a touch screen, and may receive a touch, gesture, proximity or hovering input from an electronic pen or a part of a body of the user.

The communication interface 770 may set communications between the electronic device 701 and an external device (e.g., a first external electronic device 702, a second external electronic device 704, or a server 706). For example, the communication interface 770 may be connected to a network 762 via wireless communications or wired communications so as to communicate with the external device (e.g., the second external electronic device 704 or the server 706).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 764. The short-range communications may include at least one of wireless fidelity (Wi-Fi), Bluetooth, near field communication (NFC), magnetic stripe transmission (MST), or GNSS.

The MST may generate pulses according to transmission data and the pulses may generate electromagnetic signals. The electronic device 701 may transmit the electromagnetic signals to a reader device such as a POS (point of sales) device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 762 may include at least one of telecommunications networks, for example, a computer network (e.g., local area network (LAN) or wide area network (WAN)), the Internet, or a telephone network.

The types of the first external electronic device 702 and the second external electronic device 704 may be the same as or different from the type of the electronic device 701. According to an embodiment of the present disclosure, the server 706 may include a group of one or more servers. A portion or all of operations performed in the electronic device 701 may be performed in one or more other electronic devices (e.g., the first external electronic device 702, the second external electronic device 704, or the server 706). When the electronic device 701 should perform a certain function or service automatically or in response to a request, the electronic device 701 may request at least a portion of functions related to the function or service from another device (e.g., the first external electronic device 702, the second external electronic device 704, or the server 706) instead of or in addition to performing the function or service for itself. The other electronic device (e.g., the first external electronic device 702, the second external electronic device 704, or the server 706) may perform the requested function or additional function, and may transfer a result of the performance to the electronic device 701. The electronic device 701 may use a received result itself or additionally process the received result to provide the requested function or service. To this end, for example, a cloud computing technology, a distributed computing technology, or a client-server computing technology may be used.

Figure 8:
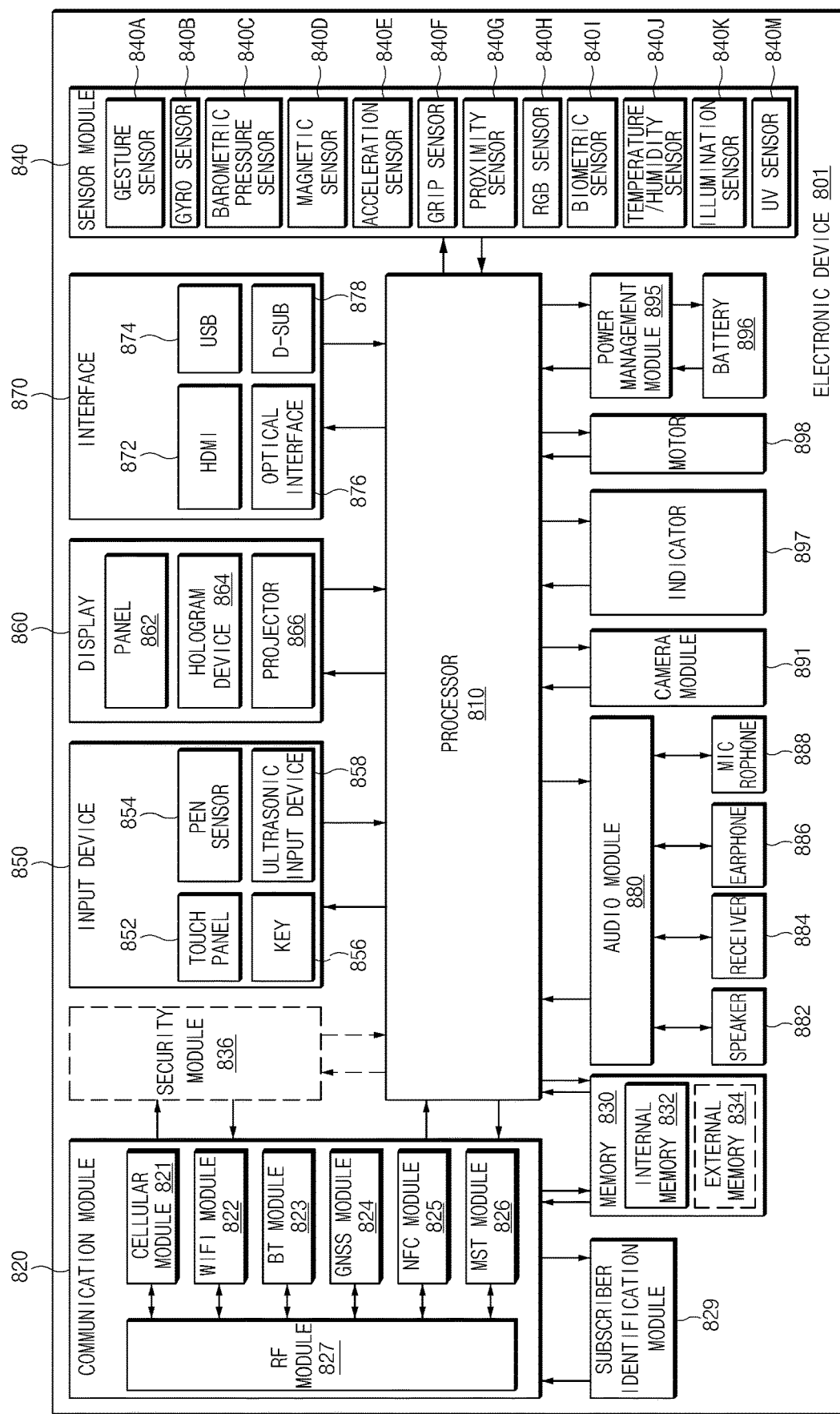
FIG. 8 is a block diagram illustrating an electronic device according to an embodiment.

FIG. 8 is a block diagram illustrating an electronic device according to an embodiment.

Referring to FIG. 8, the electronic device 801 may include, for example, all or part of an electronic device 701 shown in FIG. 7. The electronic device 801 may include one or more processors 810 (e.g., application processors (APs)), a communication module 820, a subscriber identification module (SIM) 829, a memory 830, a security module 836, a sensor module 840, an input device 850, a display 860, an interface 870, an audio module 880, a camera module 891, a power management module 895, a battery 896, an indicator 897, and a motor 898.

The processor 810 may drive, for example, an operating system (OS) or an application program to control a plurality of hardware or software components connected thereto and may process and compute a variety of data. The processor 810 may be implemented with, for example, a system on chip (SoC). According to an embodiment of the present disclosure, the processor 810 may include a graphic processing unit (GPU) (not shown) and/or an image signal processor (not shown). The processor 810 may include at least some (e.g., a cellular module 821) of the components shown in FIG. 8. The processor 810 may load a command or data received from at least one of other components (e.g., a non-volatile memory) into a volatile memory to process the data and may store various data in a non-volatile memory.

The communication module 820 may have the same or similar configuration to the communication interface 770 of FIG. 7. The communication module 820 may include, for example, the cellular module 821, a wireless-fidelity (Wi-Fi) module 822, a Bluetooth (BT) module 823, a global navigation satellite system (GNSS) module 824 (e.g., a GPS module, a Glonass module, a Beidou module, or a Galileo module), a near field communication (NFC) module 825, an MST module 826, and a radio frequency (RF) module 827.

The cellular module 821 may provide, for example, a voice call service, a video call service, a text message service, or an Internet service, and the like through a communication network. According to an embodiment of the present disclosure, the cellular module 821 may identify and authenticate the electronic device 801 in a communication network using the SIM 829 (e.g., a SIM card). According to an embodiment of the present disclosure, the cellular module 821 may perform at least part of functions which may be provided by the processor 810. According to an embodiment of the present disclosure, the cellular module 821 may include a communication processor (CP).

The Wi-Fi module 822, the BT module 823, the GNSS module 824, the NFC module 825, or the MST module 826 may include, for example, a processor for processing data transmitted and received through the corresponding module. According to various embodiments of the present disclosure, at least some (e.g., two or more) of the cellular module 821, the Wi-Fi module 822, the BT module 823, the GNSS module 824, the NFC module 825, or the MST module 826 may be included in one integrated chip (IC) or one IC package.

The RF module 827 may transmit and receive, for example, a communication signal (e.g., an RF signal). Though not shown, the RF module 827 may include, for example, a transceiver, a power amplifier module (PAM), a frequency filter, or a low noise amplifier (LNA), or an antenna, and the like. According to another embodiment of the present disclosure, at least one of the cellular module 821, the Wi-Fi module 822, the BT module 823, the GNSS module 824, the NFC module 825, or the MST module 826 may transmit and receive an RF signal through a separate RF module.

The SIM 829 may include, for example, a card which includes a SIM and/or an embedded SIM. The SIM 829 may include unique identification information (e.g., an integrated circuit card identifier (ICCID)) or subscriber information (e.g., an international mobile subscriber identity (IMSI)).

The memory 830 (e.g., a memory 730 of FIG. 7) may include, for example, an embedded memory 832 or an external memory 834. The embedded memory 832 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 834 may include a flash drive, for example, a compact flash (CF), a secure digital (SD), a micro-SD, a mini-SD, an extreme digital (xD), a multimedia car (MMC), or a memory stick, and the like. The external memory 834 may operatively and/or physically connect with the electronic device 801 through various interfaces.

The security module 836 may be a module which has a relatively higher secure level than the memory 830 and may be a circuit which stores secure data and guarantees a protected execution environment. The security module 836 may be implemented with a separate circuit and may include a separate processor. The security module 836 may include, for example, an embedded secure element (eSE) which is present in a removable smart chip or a removable SD card or is embedded in a fixed chip of the electronic device 801. Also, the security module 836 may be driven by an OS different from the OS of the electronic device 801. For example, the security module 836 may operate based on a java card open platform (JCOP) OS.

The sensor module 840 may measure, for example, a physical quantity or may detect an operation state of the electronic device 801, and may convert the measured or detected information to an electric signal. The sensor module 840 may include at least one of, for example, a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., red, green, blue (RGB) sensor), a biometric sensor 840I, a temperature/humidity sensor 840J, an illumination sensor 840K, or an ultraviolet (UV) sensor 840M. Additionally or alternatively, the sensor module 840 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 840 may further include a control circuit for controlling at least one or more sensors included therein. According to various embodiments of the present disclosure, the electronic device 801 may further include a processor configured to control the sensor module 840, as part of the processor 810 or to be independent of the processor 810. While the processor 810 is in a sleep state, the electronic device 801 may control the sensor module 840.

The input device 850 may include, for example, a touch panel 852, a (digital) pen sensor 854, a key 856, or an ultrasonic input device 858. The touch panel 852 may use at least one of, for example, a capacitive type, a resistive type, an infrared type, or an ultrasonic type. Also, the touch panel 852 may further include a control circuit. The touch panel 852 may further include a tactile layer and may provide a tactile reaction to a user.

The (digital) pen sensor 854 may be, for example, part of the touch panel 852 or may include a separate sheet for recognition. The key 856 may include, for example, a physical button, an optical key, or a keypad. The ultrasonic input device 858 may allow the electronic device 801 to detect a sound wave using a microphone (e.g., a microphone 888) and to verify data through an input tool generating an ultrasonic signal.

The display 860 (e.g., a display 760 of FIG. 7) may include a panel 862, a hologram device 864, or a projector 866. The panel 862 may include the same or similar configuration to the display 760. The panel 862 may be implemented to be, for example, flexible, transparent, or wearable. The panel 862 and the touch panel 852 may be integrated into one module. The hologram device 864 may show a stereoscopic image in a space using interference of light. The projector 866 may project light onto a screen to display an image. The screen may be positioned, for example, inside or outside the electronic device 801. According to an embodiment of the present disclosure, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-subminiature 878. The interface 870 may be included in, for example, the communication interface 770 shown in FIG. 7. Additionally or alternatively, the interface 870 may include, for example, a mobile high definition link (MHL) interface, an SD card/multimedia card (MMC) interface, or an infrared data association (IrDA) standard interface.

The audio module 880 may convert a sound and an electric signal in dual directions. At least part of components of the audio module 880 may be included in, for example, an input/output interface 750 (or a user interface) shown in FIG. 7. The audio module 880 may process sound information input or output through, for example, a speaker 882, a receiver 884, an earphone 886, or the microphone 888, and the like.

The camera module 891 may be a device which captures a still image and a moving image. According to an embodiment of the present disclosure, the camera module 891 may include one or more image sensors (not shown) (e.g., a front sensor or a rear sensor), a lens (not shown), an image signal processor (ISP) (not shown), or a flash (not shown) (e.g., an LED or a xenon lamp).

The power management module 895 may manage, for example, power of the electronic device 801. According to an embodiment of the present disclosure, though not shown, the power management module 895 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 896 and voltage, current, or temperature thereof while the battery 896 is charged. The battery 896 may include, for example, a rechargeable battery or a solar battery.

The indicator 897 may display a specific state of the electronic device 801 or part (e.g., the processor 810) thereof, for example, a booting state, a message state, or a charging state, and the like. The motor 898 may convert an electric signal into mechanical vibration and may generate vibration or a haptic effect, and the like. Though not shown, the electronic device 801 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a MediaFLO™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 9:
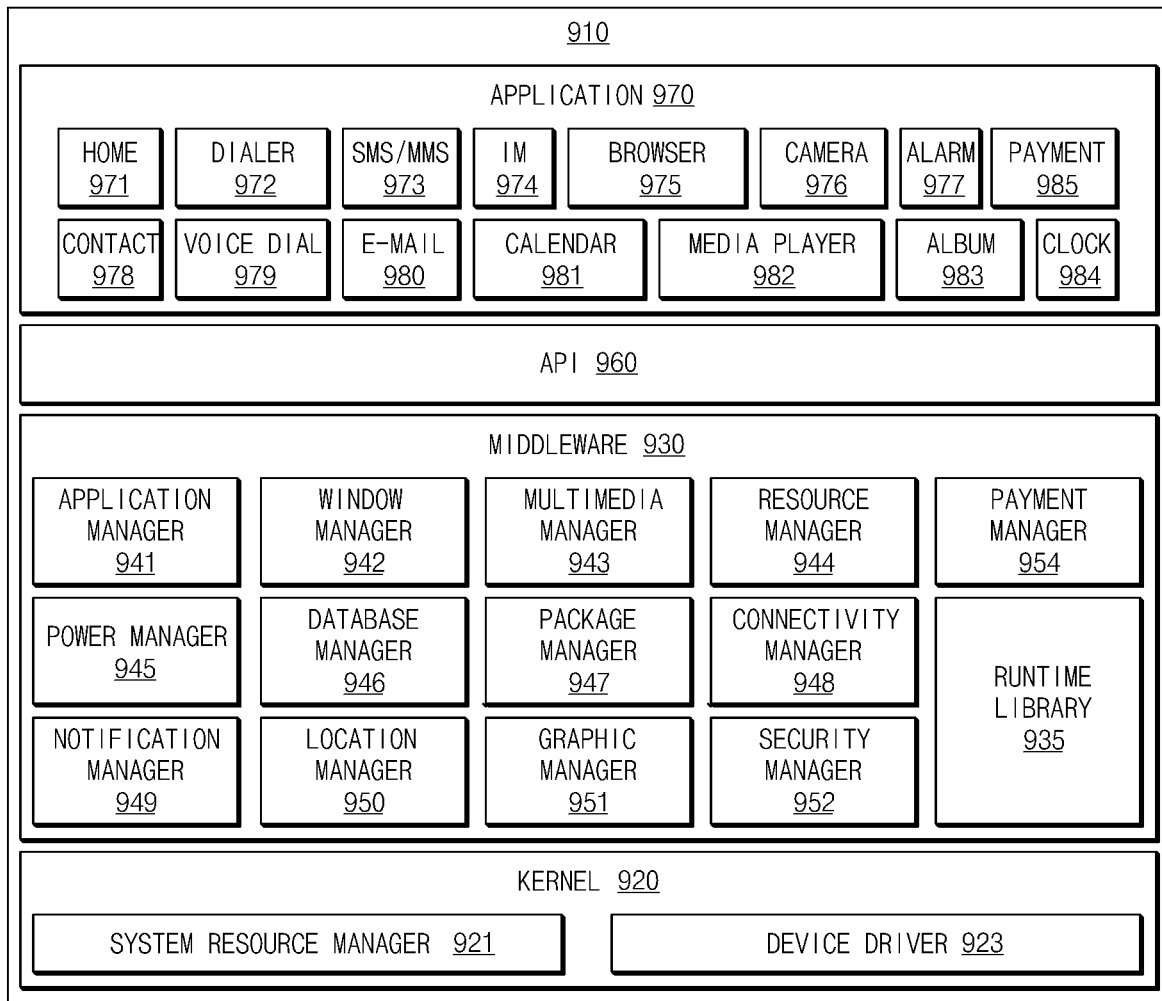
FIG. 9 is a block diagram illustrating a program module according to an embodiment.

FIG. 9 is a block diagram illustrating a program module according to an embodiment.

According to an embodiment of the present disclosure, the program module 910 (e.g., a program 740 of FIG. 7) may include an operating system (OS) for controlling resources associated with an electronic device (e.g., an electronic device 701 of FIG. 7) and/or various applications (e.g., an application program 747 of FIG. 7) which are executed on the OS. The OS may be, for example, Android, iOS, Windows, Symbian, Tizen, or Bada, and the like.

The program module 910 may include a kernel 920, a middleware 930, an application programming interface (API) 960, and/or an application 970. At least part of the program module 910 may be preloaded on the electronic device, or may be downloaded from an external electronic device (e.g., a first external electronic device 702, a second external electronic device 704, or a server 706, and the like of FIG. 7).

The kernel 920 (e.g., a kernel 741 of FIG. 7) may include, for example, a system resource manager 921 and/or a device driver 923. The system resource manager 921 may control, assign, or collect, and the like system resources. According to an embodiment of the present disclosure, the system resource manager 921 may include a process management unit, a memory management unit, or a file system management unit, and the like. The device driver 923 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 930 (e.g., a middleware 743 of FIG. 7) may provide, for example, functions the application 970 needs in common, and may provide various functions to the application 970 through the API 960 such that the application 970 efficiently uses limited system resources in the electronic device. According to an embodiment of the present disclosure, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module used by a compiler to add a new function through a programming language while the application 970 is executed. The runtime library 935 may perform a function about input and output management, memory management, or an arithmetic function.

The application manager 941 may manage, for example, a life cycle of at least one of the application 970. The window manager 942 may manage graphic user interface (GUI) resources used on a screen of the electronic device. The multimedia manager 943 may determine a format utilized for reproducing various media files and may encode or decode a media file using a codec corresponding to the corresponding format. The resource manager 944 may manage source codes of at least one of the application 970, and may manage resources of a memory or a storage space, and the like.

The power manager 945 may act together with, for example, a basic input/output system (BIOS) and the like, may manage a battery or a power source, and may provide power information utilized for an operation of the electronic device. The database manager 946 may generate, search, or change a database to be used in at least one of the application 970. The package manager 947 may manage installation or update of an application distributed by a type of a package file.

The connectivity manager 948 may manage, for example, wireless connection such as Wi-Fi connection or BT connection, and the like. The notification manager 949 may display or notify events, such as an arrival message, an appointment, and proximity notification, by a method which is not disturbed to the user. The location manager 950 may manage location information of the electronic device. The graphic manager 951 may manage a graphic effect to be provided to the user or a user interface (UI) related to the graphic effect. The security manager 952 may provide all security functions utilized for system security or user authentication, and the like. According to an embodiment of the present disclosure, when the electronic device (e.g., an electronic device 701 of FIG. 7) has a phone function, the middleware 930 may further include a telephony manager (not shown) for managing a voice or video communication function of the electronic device.

The middleware 930 may include a middleware module which configures combinations of various functions of the above-described components. The middleware 930 may provide a module which specializes according to kinds of OSs to provide a differentiated function. Also, the middleware 930 may dynamically delete some of old components or may add new components.

The API 960 (e.g., an API 745 of FIG. 7) may be, for example, a set of API programming functions, and may be provided with different components according to OSs. For example, in case of Android or iOS, one API set may be provided according to platforms. In case of Tizen, two or more API sets may be provided according to platforms.

The application 970 (e.g., an application program 747 of FIG. 7) may include one or more of, for example, a home application 971, a dialer application 972, a short message service/multimedia message service (SMS/MMS) application 973, an instant message (IM) application 974, a browser application 975, a camera application 976, an alarm application 977, a contact application 978, a voice dial application 979, an e-mail application 980, a calendar application 981, a media player application 982, an album application 983, a clock application 984, a payment application 985, a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 970 may include an application (hereinafter, for better understanding and ease of description, referred to as "information exchange application") for exchanging information between the electronic device (e.g., the electronic device 701 of FIG. 7) and an external electronic device (e.g., the first external electronic device 702 or the second external electronic device 704). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 702 or the second external electronic device 704). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 702 or the second external electronic device 704) which communicates with the electronic device, an application which operates in the external electronic device, or a service (e.g., a call service or a message service) provided from the external electronic device.

According to an embodiment of the present disclosure, the application 970 may include an application (e.g., the health card application of a mobile medical device) which is preset according to attributes of the external electronic device (e.g., the first external electronic device 702 or the second external electronic device 704). According to an embodiment of the present disclosure, the application 970 may include an application received from the external electronic device (e.g., the server 706, the first external electronic device 702, or the second external electronic device 704). According to an embodiment of the present disclosure, the application 970 may include a preloaded application or a third party application which may be downloaded from a server. Names of the components of the program module 910 according to various embodiments of the present disclosure may differ according to kinds of OSs.

According to various embodiments of the present disclosure, at least part of the program module 910 may be implemented with software, firmware, hardware, or at least two or more combinations thereof. At least part of the program module 910 may be implemented (e.g., executed) by, for example, a processor (e.g., a processor 810). At least part of the program module 910 may include, for example, a module, a program, a routine, sets of instructions, or a process, and the like for performing one or more functions.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 720), the processor may perform functions corresponding to the instructions. The computer-readable storage medium may be, for example, the memory 730.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the present disclosure as defined by the appended claims and their equivalents.

What is claimed is:
1. An electronic device comprising:
a display including a plurality of pixels;
a biometric sensor configured to acquire biometric data through a biometric sensing area of the display; and
at least one processor coupled to the display and the biometric sensor,
wherein the processor is configured to:
display a user interface in an application window at a first brightness to guide a touch input from a user, the user interface overlapped with the biometric sensor disposed in the application window,
by using a plurality of pixels outside the biometric sensing area, change a background color of the application window into a black state or a low gradation state when the user interface is displayed,
when the touch input is detected on the display within the biometric sensing area, operate one or more pixels inside the biometric sensing area at a second brightness higher than the first brightness,
control the biometric sensor to acquire the biometric data through the display while the one or more pixels inside the biometric sensing area are at the second brightness, and
while controlling the one or more pixels inside the biometric sensing area to operate at the second brightness, control the display to maintain turned-on state and the background color of the application window maintains the black state or the low gradation state.

2. The electronic device of claim 1, wherein in operating the plurality of pixels outside the biometric sensing area in the black state or the low gradation state, the processor is further configured to disable the plurality of pixels outside the biometric sensing area.

3. The electronic device of claim 1, wherein in operating the one or more pixels inside the biometric sensing area at the second brightness, the processor is further configured to increase an amount of electric power supplied to the one or more pixels inside the biometric sensing area.

4. The electronic device of claim 1, wherein when the plurality of pixels outside the biometric sensing area are operated in the black state or the low gradation state, a load on the plurality of pixels outside the biometric sensing area is reduced.

5. The electronic device of claim 4, wherein the load on the plurality of pixels outside the biometric sensing area is reduced by changing a specific gradation value for the plurality of pixels outside the biometric sensing area.

6. The electronic device of claim 1, further comprising a display driver integrated circuit (IC), wherein the display is configured such that voltages supplied to regions of the display are reduced according to a distance a particular region is disposed from the display driver IC, and wherein the display driver IC is disposed adjacent to the biometric sensing area of the display.

7. The electronic device of claim 1, further comprising:
an illumination sensor configured to detect an intensity of illumination,
wherein the one or more pixels inside the biometric sensing area are operated at the second brightness when an intensity of environmental illumination as detected by the illumination sensor exceeds a pre-specified value.

8. The electronic device of claim 1, wherein the processor is configured to stop operating the one or more pixels inside the biometric sensing area at the second brightness when the touch input is no longer detected.

9. The electronic device of claim 1, wherein a first time period for which the one or more pixels inside the biometric sensing area are operated at the second brightness is determined based a second time period that the biometric sensor uses to acquire the biometric data.

10. The electronic device of claim 1, further comprising a motor coupled to the processor, and wherein the processor is further configured to operate the motor to generate a vibration when acquisition of the biometric data is complete.

11. A method of an electronic device having a display, comprising:
displaying a user interface at a biometric sensing area in an application window of the display at a first brightness to guide a touch input from a user, the biometric sensing area corresponding to a biometric sensor configured to acquire biometric data through the biometric sensing area, and the user interface overlapped with the biometric sensor disposed in the application window;
by using a plurality of pixels of the display outside the biometric sensing area, change a background color of the application window into a black state or a low gradation state when the user interface is displayed;
when the touch input is detected on the display within the biometric sensing area, operating one or more pixels of the display inside the biometric sensing area at a second brightness higher than the first brightness;
controlling the biometric sensor to acquire the biometric data through the display while the one or more pixels inside the biometric sensing area are at the second brightness; and
while controlling the one or more pixels inside the biometric sensing area to operate at the second brightness, controlling the display to maintain turned-on state and the background color of the application window maintains the black state or the low gradation state.

12. The method of claim 11, further comprising disabling the plurality of pixels outside the biometric sensing area.

13. The method of claim 11, wherein to operate the one or more pixels inside the biometric sensing area at the second brightness, the method further comprises increasing an amount of electric power supplied to the one or more pixels inside the biometric sensing area.

14. The method of claim 11, wherein when the plurality of pixels outside the biometric sensing area are operated in the black state or the low gradation state, a load on the plurality of pixels outside the biometric sensing area is reduced.

15. The method of claim 14, further comprising changing a specific gradation value for the plurality of pixels outside the biometric sensing area to reduce the load on the plurality of pixels outside the biometric sensing area.

16. The method of claim 11, wherein the electronic device further comprises a display driver integrated circuit (IC),
wherein the display is configured such that voltages supplied to regions of the display are reduced according to a distance a particular region is disposed from the display driver IC, and
wherein the display driver IC is disposed adjacent to the biometric sensing area of the display.

17. The method of claim 11, wherein the electronic device further comprises an illumination sensor configured to detect an intensity of illumination, and wherein the one or more pixels inside the biometric sensing area are operated at the second brightness when an intensity of environmental illumination as detected by the illumination sensor exceeds a pre-specified value.

18. The method of claim 11, further comprising stopping the operation of the one or more pixels inside the biometric sensing area at the second brightness when the touch input is no longer detected.

19. The method of claim 11, wherein a first time period for which the one or more pixels inside the biometric sensing area are operated at the second brightness is determined based a second time period that the biometric sensor uses to acquire the biometric data.

20. The method of claim 11, wherein the electronic device further comprises a motor, and the method further comprises operating the motor to generate a vibration when acquisition of the biometric data is complete.

21. An electronic device comprising:
a display including a plurality of pixels;
a biometric sensor corresponding a biometric sensing area of the display; and
at least one processor coupled to the display and the biometric sensor,
wherein the processor is configured to:
by using a plurality of pixels outside the biometric sensing area, change a background color of an application window into a black state or a low gradation state when a user interface in the application window at a first brightness is displayed in the biometric sensing area, the user interface overlapped with the biometric sensor disposed in the application window, and
control the biometric sensor to acquire biometric data when the user interface is displayed at a second brightness higher than the first brightness, and
while controlling the one or more pixels inside the biometric sensing area to operate at the second brightness, control the display to maintain turned-on state and the background color of the application window maintains the black state or the low gradation state.

22. The electronic device of claim 21, wherein in operating the plurality of pixels outside the biometric sensing area in the black state or the low gradation state, the processor is further configured to disable the plurality of pixels outside the biometric sensing area.

23. The electronic device of claim 21, wherein in displaying the user interface at the second brightness, the processor is further configured to increase an amount of electric power supplied to one or more pixels inside the biometric sensing area.

24. The electronic device of claim 21, wherein when the plurality of pixels outside the biometric sensing area are operated in the black state or the low gradation state, a load on the plurality of pixels outside the biometric sensing area is reduced.

25. The electronic device of claim 24, wherein the load on the plurality of pixels outside the biometric sensing area is reduced by changing a specific gradation value for the plurality of pixels outside the biometric sensing area.

26. The electronic device of claim 21, further comprising a display driver integrated circuit (IC),
wherein the display is configured such that voltages supplied to regions of the display are reduced according to a distance a particular region is disposed from the display driver IC, and
wherein the display driver IC is disposed adjacent to the biometric sensing area of the display.

27. The electronic device of claim 21, further comprising:
an illumination sensor configured to detect an intensity of illumination,
wherein the user interface is displayed at the second brightness when an intensity of environmental illumination as detected by the illumination sensor exceeds a pre-specified value.

28. The electronic device of claim 21, wherein the processor is configured to stop displaying the user interface at the second brightness when a touch input is no longer detected.

29. The electronic device of claim 21, wherein a first time period for which the user interface is displayed at the second brightness is determined based a second time period that the biometric sensor uses to acquire the biometric data.

30. The electronic device of claim 21, further comprising a motor coupled to the processor, and wherein the processor is further configured to operate the motor to generate a vibration when acquisition of the biometric data is complete.

* * * * *